United States Patent
Rastoll et al.

(10) Patent No.: US 11,619,947 B2
(45) Date of Patent: Apr. 4, 2023

(54) WIRELESS COMMUNICATION FOR ALIGNING A VEHICLE TO A WIRELESS CHARGER

(71) Applicant: Valeo Schalter und Sensoren GmbH, Bietigheim-Bissingen (DE)

(72) Inventors: Cyril Rastoll, Palo Alto, CA (US); Malte Joos, Stuttgart (DE); Shahram Rezaei, Danville, CA (US)

(73) Assignee: VALEO SCHALTER UND SENSOREN GMBH

( * ) Notice: Subject to any disclaimer, the term of this patent is extended or adjusted under 35 U.S.C. 154(b) by 807 days.

(21) Appl. No.: 16/372,266

(22) Filed: Apr. 1, 2019

(65) Prior Publication Data

US 2020/0307403 A1    Oct. 1, 2020

(51) Int. Cl.
*B60L 53/36* (2019.01)
*G05D 1/02* (2020.01)
(Continued)

(52) U.S. Cl.
CPC ............ *G05D 1/0225* (2013.01); *B60L 53/36* (2019.02); *B60L 53/66* (2019.02); *G05D 1/0022* (2013.01);
(Continued)

(58) Field of Classification Search
CPC .......... B60L 53/36; B60L 53/66; B60L 53/12; B60L 53/126; B60L 53/37; B60L 53/38;
(Continued)

(56) References Cited

U.S. PATENT DOCUMENTS 6,983,204 B2 * 1/2006 Knutson ............ G01C 21/3415
                                                            701/414
10,126,755 B1 * 11/2018 Lavi ..................... B60D 1/62
(Continued)

FOREIGN PATENT DOCUMENTS

| CN | 106394301 A | * | 2/2017 |
| CN | 106530820 A | * | 3/2017 |
| JP | 2016038700 A | * | 3/2016 |

OTHER PUBLICATIONS

Aditya K, "Design and Implementation of an Inductive Power Transfer System for Wireless Charging of Future Electric Transportation", Thesis Submitted to the Faculty of Graduate Studies through the Department of Electrical, Computer & Software Engineering in Partial Fulfillment of the Requirements for the Degree of Doctor of Philosophy at the University of Ontario Institute of Technology, Aug. 2016, 190 pages.
(Continued)

*Primary Examiner* — Pinping Sun
(74) *Attorney, Agent, or Firm* — Weaver Austin Villeneuve & Sampson LLP

(57) ABSTRACT

Techniques are described for aligning a vehicle to a wireless charger. Wireless communication is performed between at least a first wireless device of the vehicle and at least a second wireless device external to the vehicle. The first wireless device has a stationary position relative to the vehicle. The second wireless device has a stationary position relative to the wireless charger. Based on the wireless communication, a distance between the first and second wireless devices is measured and used to determine the relative position of the vehicle. A trajectory is calculated, based on the relative position of the vehicle, to enable the vehicle to be maneuvered into a charging position in which a charge receiving device of the vehicle is aligned with respect to the wireless charger. In some embodiments, multiple wireless devices on the vehicle or external to the vehicle participate in determining the relative position of the vehicle.

18 Claims, 12 Drawing Sheets

(51) Int. Cl.
*G05D 1/00* (2006.01)
*H02J 50/90* (2016.01)
*H02J 50/80* (2016.01)
*H02J 50/10* (2016.01)
*B60L 53/66* (2019.01)
*B60L 53/12* (2019.01)

(52) U.S. Cl.
CPC ............ *G05D 1/0246* (2013.01); *H02J 50/10* (2016.02); *H02J 50/80* (2016.02); *H02J 50/90* (2016.02); *B60L 53/12* (2019.02)

(58) Field of Classification Search
CPC ............. B60L 2260/22; B60L 2260/32; G05D 1/0022; G05D 1/0225; G05D 1/0246; G05D 2201/0213; H02J 7/025; H02J 50/10; H02J 50/80; H02J 50/90; Y02T 10/70; Y02T 90/12; Y02T 90/16; Y02T 10/7072; Y02T 90/14
See application file for complete search history.

(56) References Cited

U.S. PATENT DOCUMENTS

| | | | |
|---|---|---|---|
| 2005/0086051 A1* | 4/2005 | Brulle-Drews | G01C 21/3697 704/7 |
| 2007/0042803 A1* | 2/2007 | Anderson | G05D 1/0225 455/556.1 |
| 2008/0288162 A1* | 11/2008 | Theimer | G08G 1/164 701/117 |
| 2014/0015328 A1* | 1/2014 | Beaver | H02J 7/34 307/104 |
| 2014/0035526 A1* | 2/2014 | Tripathi | B60L 53/36 320/109 |
| 2014/0218508 A1* | 8/2014 | Kim | G05D 1/0246 348/118 |
| 2014/0253029 A1* | 9/2014 | Uchida | B60L 53/126 320/108 |
| 2015/0015193 A1* | 1/2015 | Oman | B60L 53/126 320/108 |
| 2015/0061576 A1* | 3/2015 | Chen | B60L 53/126 320/108 |
| 2015/0239354 A1* | 8/2015 | Gorai | B60L 53/37 307/10.1 |
| 2016/0182548 A1* | 6/2016 | Ghabra | H04L 63/107 726/23 |
| 2016/0318413 A1* | 11/2016 | Roehrl | H02J 50/80 |
| 2017/0276534 A1* | 9/2017 | Vermue | A01D 90/10 |
| 2019/0173327 A1* | 6/2019 | Park | H02J 50/90 |
| 2019/0233009 A1* | 8/2019 | Joos | G05D 1/0088 |
| 2020/0039368 A1* | 2/2020 | Sieber | H02J 50/70 |
| 2020/0136438 A1* | 4/2020 | Seong | H02J 50/90 |

OTHER PUBLICATIONS

BMW Wireless Charging. Car Charging in 3,5 hrs. Without a Cable, Available Online at: https://www.youtube.com/watch?v=GlrcPrzuPMM, Sep. 22, 2017, Retrieved from the internet on Apr. 9, 2019, 4 pages.

* cited by examiner

WIRELESS COMMUNICATION FOR ALIGNING A VEHICLE TO A WIRELESS CHARGER

BACKGROUND

Aspects of the disclosure relate to using wireless communication to facilitate maneuvering of a vehicle in connection with aligning the vehicle to a wireless charger. Vehicles with electric motors are usually charged by plugging the vehicle directly into a charging station. Wireless charging technology is becoming an increasingly popular alternative to plug-in charging. Wireless charging requires proper alignment between a charger (e.g., a charging pad on the ground) and a charge receiving device on the vehicle. If the charge receiving device and the wireless charger are misaligned, charging efficiency is adversely affected. Sometimes, the location of the charger is not readily visible, for example, when the charger is covered by rain or snow. Further, once the vehicle is driven close to the charger, the driver can no longer see the charger and may therefore experience difficulty maneuvering the vehicle into a charging position.

BRIEF SUMMARY

Methods, apparatuses, and computer-readable media are disclosed for determining a position of a vehicle relative to a wireless charger based on wireless communication between one or more wireless devices of the vehicle and one or more wireless devices external to the vehicle, e.g., wireless devices located on or near the wireless charger. Various techniques for determining the relative position of the vehicle are described. In certain embodiments, the determined position of the vehicle is used to compute a trajectory to the wireless charger, in order to perform automated parking to bring the vehicle into a charging position relative to the wireless charger or to assist the driver with manual parking (e.g., through presenting a visual representation of the trajectory and/or a visual representation of the vehicle or a charge receiving device of the vehicle relative to the wireless charger on a display device of the vehicle). The charge receiving device may be electrically coupled to a battery that powers an electric motor of the vehicle, to a battery that starts a vehicle engine, or to some other load in the vehicle. Thus, the embodiments can be used with electric vehicles, hybrid electric vehicles, or vehicles with internal combustion engines.

In certain embodiments, a method for aligning a vehicle to a wireless charger includes performing wireless communication between at least a first wireless device of the vehicle and at least a second wireless device external to the vehicle, where the first wireless device has a stationary position relative to the vehicle, and where the second wireless device has a stationary position relative to the wireless charger. The method further includes obtaining a measured distance between the first wireless device and the second wireless device, and determining, based on the measured distance, a position of the vehicle relative to the wireless charger. The distance is measured based on the wireless communication. The method further includes calculating, by a processor of the vehicle, based on the determined position of the vehicle relative to the wireless charger, a trajectory according to which the vehicle can be maneuvered into a charging position in which a charge receiving device of the vehicle is aligned with respect to the wireless charger.

In certain embodiments, a vehicle system includes at least a first wireless device located on the vehicle and a vehicle control unit coupled to the first wireless device, with the vehicle control unit configured to control the first wireless device such the first wireless device performs wireless communication with at least a second wireless device external to the vehicle. The first wireless device has a stationary position relative to the vehicle. The second wireless device has a stationary position relative to the wireless charger. The vehicle control unit is further configured to obtain a measured distance between the first wireless device and the second wireless device, and determine, based on the measured distance, a position of the vehicle relative to the wireless charger. The distance is measured based on the wireless communication. The vehicle control unit is further configured to calculate, based on the determined position of the vehicle relative to the wireless charger, a trajectory according to which the vehicle can be maneuvered into a charging position in which a charge receiving device of the vehicle is aligned with respect to the wireless charger.

In certain embodiments, multiple distance measurements are performed for determining the position of a vehicle relative to a wireless charger. The distance measurements involve communication between a plurality of wireless devices, which include at least one wireless device on the vehicle and at least one wireless device external to the vehicle. Wireless devices that are external to the vehicle can be located on or near the wireless charger. Wireless devices that are on the vehicle can be placed in various locations throughout the vehicle, such as at each of the corners.

In certain embodiments, a distance measurement based on wireless communication between wireless devices is combined with sensor data from one or more sensors on-board a vehicle. The sensor data provides additional information for more precisely determining the relative position of the vehicle.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As used herein, the term "wireless device" refers to an electronic device operable for sending and/or receiving wireless signals such as radio-frequency (RF) signals. Thus, a wireless device can be a transmitter, a receiver, or a transceiver. In certain embodiments described herein and disclosed in the figures, various wireless devices are referred to as being transmitters or receivers in order to emphasize their role in sending or receiving wireless signals. Unless expressly indicated otherwise, transmitters and receivers can be implemented as transceivers, that is, wireless devices that are operable for both sending and receiving wireless signals. A wireless device may include one or more processors configured to perform various processing steps described herein, including measuring distances to other wireless devices, transmitting distance information to other wireless devices, calculating a position of a vehicle, and calculating a trajectory of a vehicle based on the vehicle's position.

For convenience, reference has been made throughout this disclosure to aligning a vehicle relative to a wireless charger. Aligning the vehicle refers to placing the vehicle into a charging position in which a charge receiving device of the vehicle is coupled to a wireless charger (e.g., an inductive charging pad). Thus, the ultimate objective of the vehicle alignment is alignment of the charge receiving device to the wireless charger. The charging position is preferably a position of optimal charging efficiency, but the charging position can encompass a range of relative positions, including positions of sub-optimal charging efficiency.

In certain embodiments, the wireless signals are ultra-wideband (UWB) signals. UWB communications involve RF signals transmitted over a relatively short range (usually within 50 meters), a large bandwidth (typically greater than 500 megahertz), and using less power compared to narrowband communication technology such as Wi-Fi. UWB is capable of providing distance measurements, estimated using a time of flight between sending a UWB signal and receiving a corresponding UWB signal back at the sender, with a high degree of accuracy (a distance resolution of 10 centimeters or less is typical). In contrast, the distance resolution of Wi-Fi or Bluetooth signal strength-based distance measurement is typically on the order of several meters. Thus, UWB is well-suited for use in connection with alignment to a wireless charger.

Figure 1:
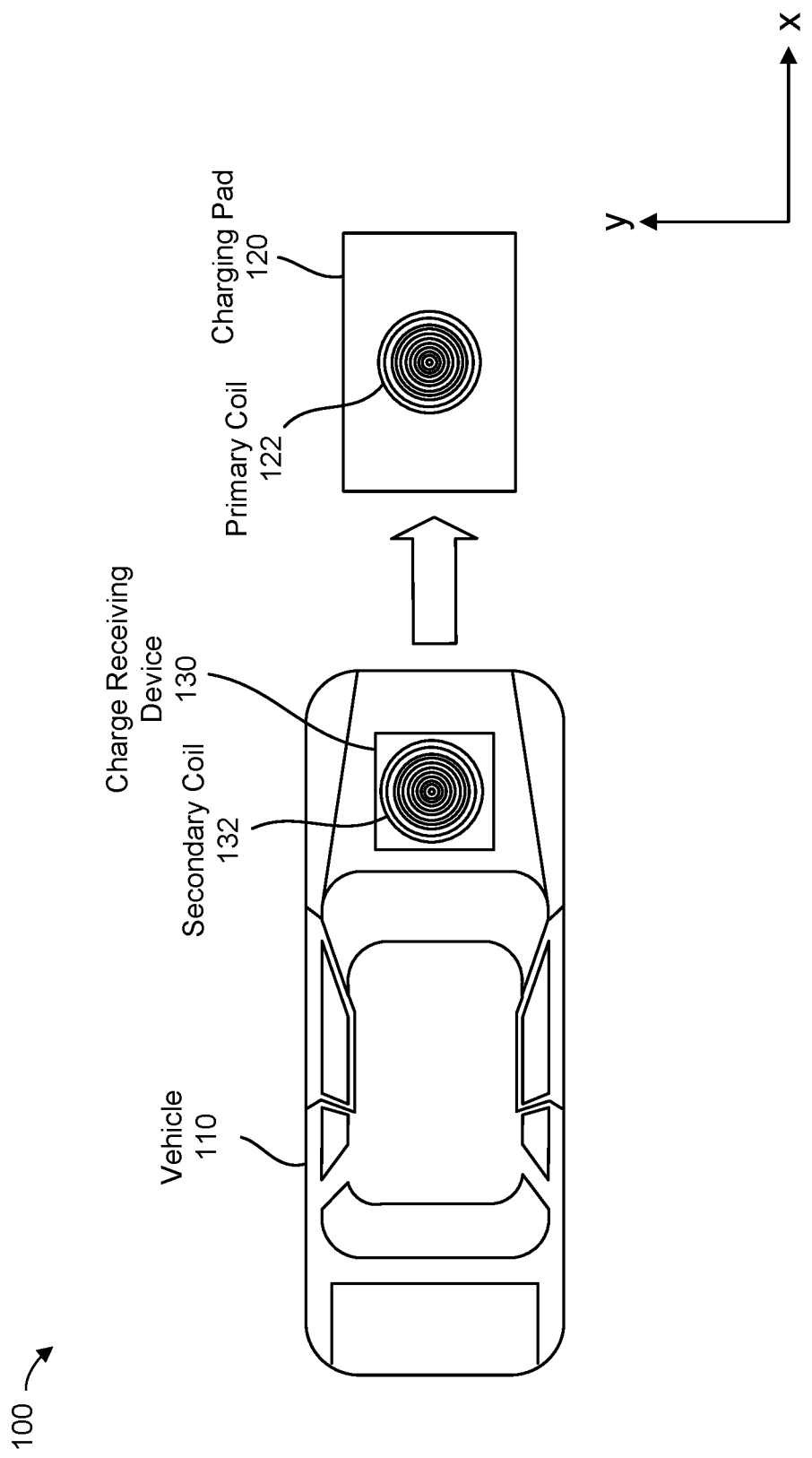
FIG. 1 illustrates a system in which one or more embodiments of the present disclosure can be implemented.

FIG. 1 illustrates a system 100 in which one or more embodiments of the present disclosure can be implemented. The system 100 includes a vehicle 110 and a wireless charger in the form of a charging pad 120. The vehicle 110 can be, for example, an electric vehicle with an electric motor that is powered by a battery, where the battery is charged through wireless power transfer between the charging pad 120 and a charge receiving device 130 of the vehicle 110. The charge receiving device 130 can be located in various positions throughout the vehicle. A typical location of the charge receiving device is around a bottom of the vehicle chassis, close to an exterior surface. The location of the charge receiving device is generally determined by a vehicle manufacturer.

In the example of FIG. 1, the charging pad 120 is an inductive charger comprising a primary coil 122. The charge receiving device 130 of the vehicle 110 comprises a secondary coil 132 that is inductively coupled to the primary coil 122 when the vehicle is placed into a charging position. As shown in FIG. 1, the charge receiving device 130 can be positioned near a front of the vehicle 110. The wireless charger and the charge receiving device may include additional electrical components not depicted, such as a voltage or current source, a voltage or current regulator, or other components typically used in wireless power transfer circuits.

The charging pad 120 may include a housing for the primary coil 112. For example, the charging pad 120 may comprise a rigid shell enclosing the primary coil. Alternatively, the charging pad 120 could be a flexible membrane (e.g., a rubber floor mat) in which the primary coil is embedded. Because inductive charging generally requires a relatively large surface area compared to a thickness of the charging device, inductive chargers are usually implemented as pads. However, other form factors as also possible. In some embodiments, the primary coil 112 may be directly embedded in the ground without being disposed in a housing. Similarly, the charge receiving device 130 may include a housing for the secondary coil 132 or, alternatively, the secondary coil 132 may be integrated into the vehicle without a separate housing.

Figure 2:
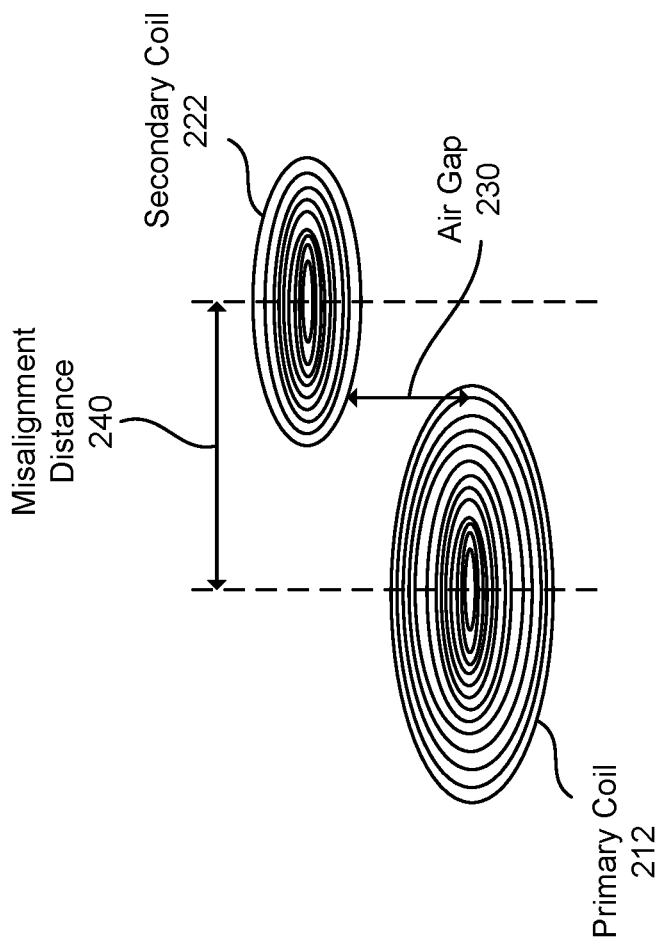
FIG. 2 illustrates misalignment between a wireless charger and a charge receiving device.

FIG. 2 illustrates misalignment between a primary coil 212 of a wireless charger and a secondary coil 222 of a charge receiving device. The primary coil 212 and the secondary coil 222 are shown as being parallel, but can be at an angle to each other. In some embodiments, the misalignment may be expressed as a distance 240 from the center of the primary coil 212 to the center of the secondary coil 222. The centers of the primary and secondary coils would typically be the geometric centers of the charging pad 120 and the charge receiving device 130, since the coils are usually located in the middle of the charging pad and the charge receiving device.

Charging efficiency is typically maximized when the distance 240 is approximately zero. Mutual inductance, which is a measure of charging efficiency, decreases monotonically at a rate that depends on the size of the air gap. For example, for an air gap of 10 centimeters and a primary coil diameter of 12 to 15 inches, the mutual inductance is around 60 microhenries at a distance of 60 centimeters and becomes zero at around 33 centimeters.

The misalignment between a charge receiving device and a wireless charger can also be represented in a three-dimensional (3D) coordinate system, e.g., as a difference between a 3D coordinate corresponding to the center of the primary coil 212 and a 3D coordinate corresponding to the center of the secondary coil 222. In the context of wireless charging for vehicles, one of these dimensions is usually constrained because the vertical distance between the primary and secondary coils (represented by air gap 230) is generally fixed. For example, unless the ground is very uneven, the size of the air gap 230 can be expected to remain substantially constant as the vehicle is driven toward the wireless charger. Thus, the misalignment can be represented in one, two, or three dimensions.

For aligning the vehicle to the charging pad 120, it may in some instances be advantageous to express the misalignment in terms of a two-dimensional (2D) offset. For example, referring back to FIG. 1, the misalignment can be expressed as a difference between an (x, y) coordinate of the center of the charge receiving device 130 and an (x, y) coordinate of the center of the charging pad 120, where the coordinate system is referenced to the vehicle 110 or the charging pad 120.

Figure 9:
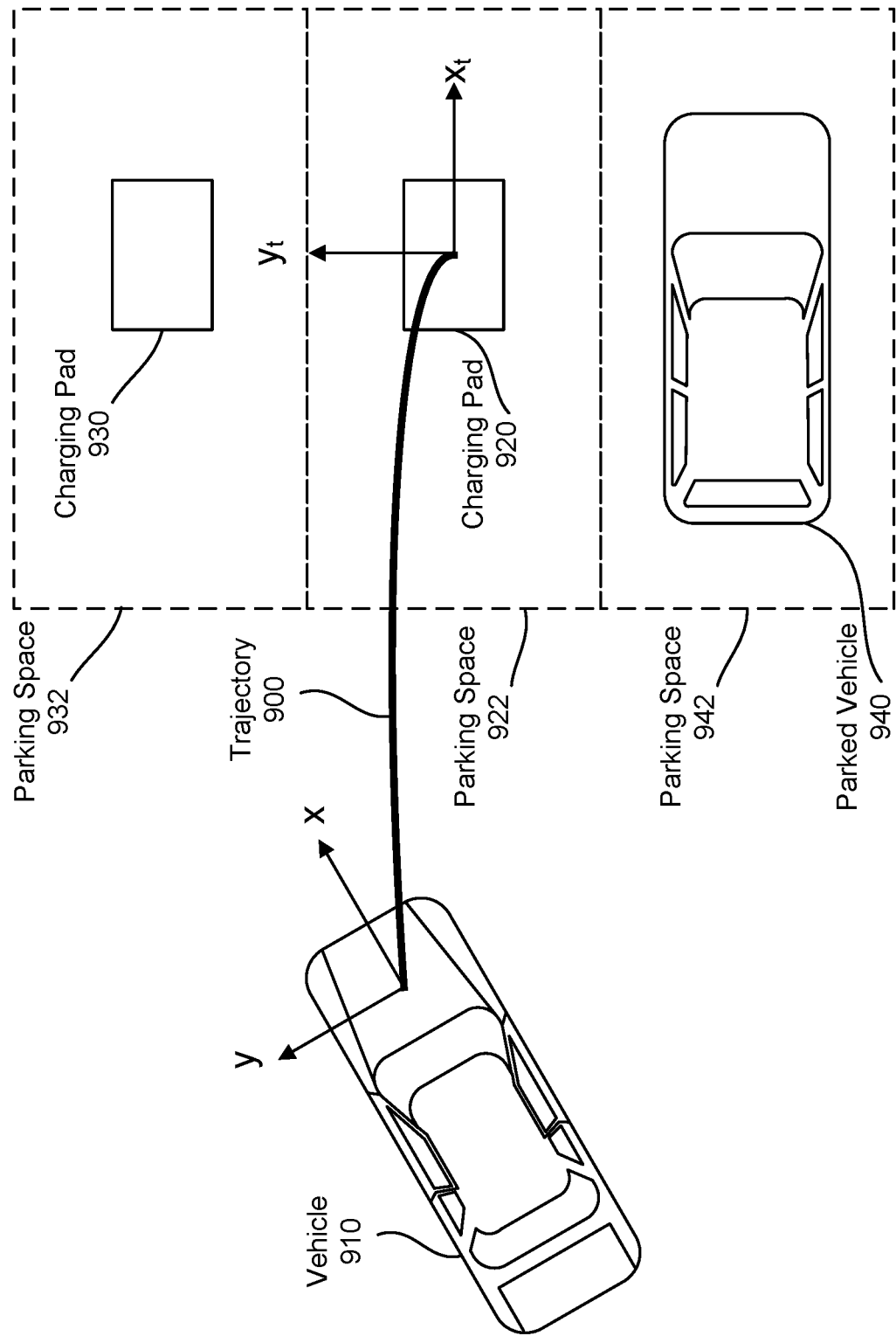
FIG. 9 illustrates an example trajectory for aligning a vehicle to a wireless charger, according to one or more embodiments.

Expressing the misalignment as a 2D offset would facilitate maneuvering of the vehicle 110 into a charging position relative to the charging pad 120 and is useful in situations where the vehicle should be parked in a certain orientation. For example, as shown in FIG. 9, the charging pad may be located within a designated parking space, in which case it may be desirable not only to park the vehicle such that the distance between the centers of the primary coil and secondary coil is minimized, but also to park the vehicle such that the vehicle is well-positioned within the boundaries of the parking space.

Figure 3:
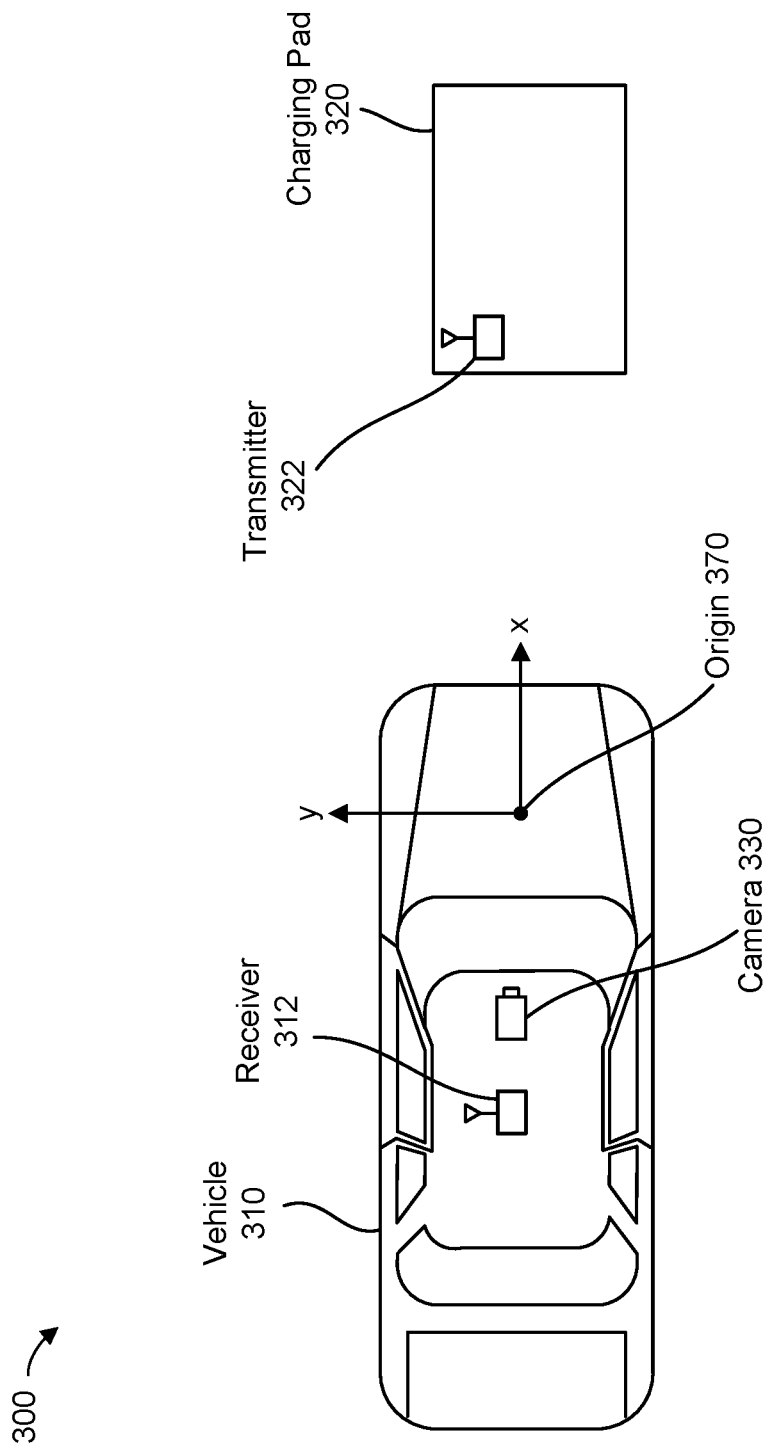
FIGS. 3 to 5 illustrate example systems according to certain embodiments.

FIG. 3 illustrates an example system 300 according to an embodiment. The system 300 includes a vehicle 310 and a charging pad 320. For simplicity, the charge receiving device has been omitted from FIG. 3 and the figures that follow. As shown in FIG. 3, the vehicle includes a receiver 312 and the charging pad 320 includes a transmitter 322. The vehicle also includes a front facing camera 330. The transmitter 322 may broadcast beacon signals (e.g. UWB signals) periodically into the surrounding environment. When the vehicle 310 is within range of the transmitter 322, the receiver 312 detects the beacon signals and determines a distance from the transmitter 322 to the receiver 312 based on the beacon signals (e.g., based on a time-of-flight measurement). The distance may be computed by a processor within the receiver 312 or by another processing component of the vehicle such as an electronic control unit (ECU) communicatively coupled to the receiver 312.

Although FIG. 3 depicts the transmitter 322 as being on the charging pad 320, the transmitter 322 could be external to the charging pad 320. The transmitter 322 can be powered using the same power source that powers the charging pad (e.g., a voltage source that also supplies power to control circuitry of the charging pad). Since the charging pad can be expected to be continuously powered, sharing the same power source would guarantee that power is available to the transmitter 322. In some embodiments, the transmitter 322 may include a battery that is recharged by the charging pad 320 (e.g., using the same power transfer mechanism used for a charge receiving device of the vehicle). Sharing a power source with a wireless charger can be applied to any wireless device external to the vehicle. Alternatively, wireless devices external to the device can be powered by a separate power source, such as by plugging the wireless device into an electrical outlet of a parking infrastructure. Plugging into an electrical outlet generally requires the use of additional wiring. For portability and flexibility of placement (e.g., on a support column not located near any electrical outlet), wireless devices external to the vehicle can be powered by a local power source separate from the charging pad, such as an internal battery. However, internal batteries have a limited capacity and would need to be periodically replaced or recharged.

The receiver 312 may be powered by an in-vehicle power source (e.g., the battery of the vehicle 310) while the transmitter 322 operates off power from a battery of the charging pad 320 or an external power source. In certain embodiments, the transmitter 322 is a UWB anchor with a known position relative to the charging pad 320.

The system 300 can be used to determine a position of the vehicle 310 relative to the charging pad 320. In particular, the relative position can be determined by combining the distance measured based on wireless communication between the transmitter 322 and the receiver 312 with image data generated by the camera 330. For example, the image data may be processed to determine an angle of the vehicle relative to the charging pad 320, and a 2D offset may be computed using the angle and the measured distance. The offset could be based on a 2D coordinate system in which the origin 370 is the center of the charge receiving device or the location of the receiver 312. Thus, the misalignment of the vehicle 310 could be expressed in terms of the difference between a 2D coordinate of the charging pad 320 and the origin 370. Alternatively, the coordinate system could be referenced to the charging pad 320, in which case the origin could be the center of the charging pad 320 or the location of transmitter 322.

FIG. 3 is an example of fusion of a distance measurement with camera data. Fusion refers to a process of combining sensor data from a plurality of sources to determine information not available when the data sources are considered individually. Other types of sensor fusion can be used to determine the relative position of the vehicle. In particular, the vehicle 310 may be equipped with any number of sensors that generate data that can be fused with data from a wireless device. Examples of such sensors include cameras, Light Detection and Ranging (LIDAR) sensors, Radio Detection and Ranging (radar) sensors, and ultrasonic sensors. As another example, radar or LIDAR data could be used to identify the boundaries of the charging pad 320 and combined with the measured distance to determine the relative position of the vehicle 310. Further, the vehicle 310 may include multiple instances of the same type of sensor (e.g., multiple cameras around a perimeter of the vehicle).

FIG. 3 is also an example of a system in which position determination is performed at the vehicle, i.e., by one or more processors of the vehicle, such as a processor within the receiver 312. As disclosed in connection with additional embodiments below, position determination can, alternatively, be performed outside the vehicle (e.g., by a processor of the charging pad 320 or a processor of a wireless device placed near the charging pad 320).

Figure 4:
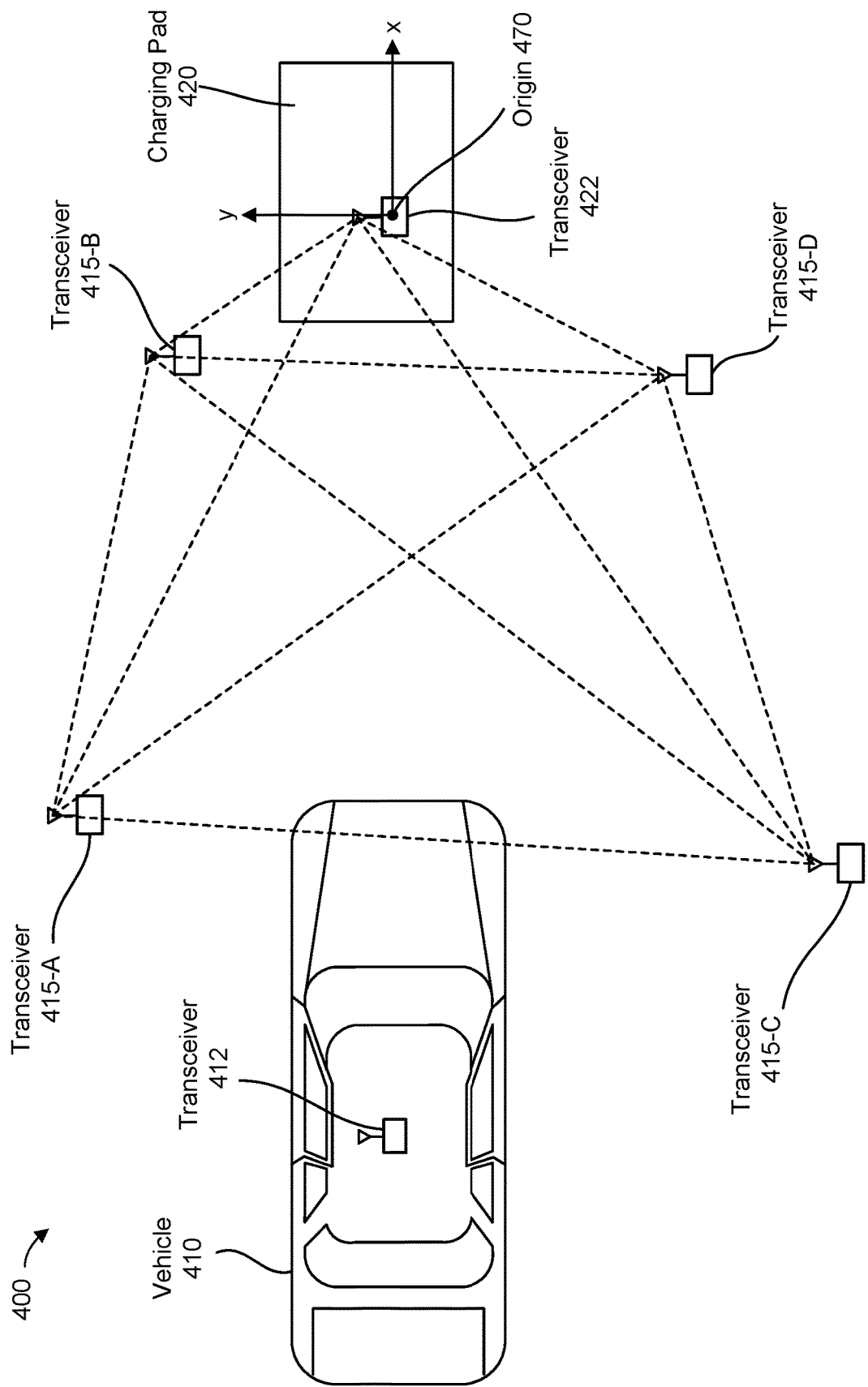

FIG. 4 illustrates an example system 400 according to an embodiment. The system 400 includes a vehicle 410, a charging pad 420, and a plurality of transceivers 415 located in an environment around the charging pad 420. In one embodiment, the transceivers 415 are UWB anchors and the transceivers 412 and 422 are UWB tags. The transceivers 415 may broadcast beacon signals at preconfigured intervals. As mentioned above in connection with FIG. 3, wireless devices external to the vehicle can be powered in various ways. Thus, the transceivers 415 may be powered using a local battery or an external power source in the environment. For example, in a parking infrastructure such as a garage, the transceivers 415 could be mounted on a wall or support column near the charging pad 420 and powered through cables coupled to an electrical system of the parking infrastructure. Similarly, the charging pad 420 includes a transceiver 422 that can be powered by a local battery of the charging pad or an external power source in the environment. In one embodiment, the transceivers 415 and 422 are all powered by the same power source (e.g., the power source of the charging pad 420). The vehicle 410 also includes a transceiver 412, which can be powered by a battery or other power source in the vehicle 410.

As shown in FIG. 4, the distances between each of the transceivers 415 and the distances between each transceiver 415 and the transceiver 422 of the charging pad 420 can be determined through wireless communications. For example, each transceiver 415 may engage in wireless communication with every other transceiver 415 to measure the distances between each pair of transceivers 415. Further, each transceiver 415 may engage in wireless communication with the transceiver 422 to measure the distances between the transceiver 422 and each of the transceivers 415. In one embodiment, these distances (e.g., ten in total) are processed by the transceiver 422 to determine the relative positions of the transceivers 415 in a 2D coordinate system. For example, in a 2D coordinate system with an origin 470 at the transceiver 422, the positions of the transceivers 415 relative to the transceiver 422 are eight unknowns that can be solved for using the ten distance measurements. Various methods can be used for solving for the relative positions of the transceivers 415. One way is to estimate the relative positions of the transceivers 415 using a least squares estimation algorithm.

The relative positions of the transceivers 415 may be determined any time after installation of the transceivers 415 and the transceiver 422. In particular, the relative positions of the transceivers 415 may be determined prior to the vehicle 410 coming within communication range of the transceivers 415. In this way, the relative positions of the transceivers 415 may be known in advance, e.g., stored in a memory of the transceiver 422. Although the determination of the relative positions of the transceivers 422 can be repeated, this is generally unnecessary after the first time since the transceivers 415 and 422 are usually fixed in place. Thus, in the example of FIG. 4, the transceiver 412 of the vehicle 410 may be the only transceiver that is mobile.

Additionally, in FIG. 4 the position of the transceiver 422 relative to the charging pad 420 may be known even without performing any distance measurements since the transceiver 422 can be mounted on or fixed at a predetermined location, and therefore in a stationary position, with respect to the charging pad 420. This may be true for any wireless device associated with a wireless charger. Further, even if the wireless device associated with the wireless charger is not placed in a predetermined location relative to the wireless charger, the relative position can still be determined, e.g., using one or more distance measurements. Thus, the relative position of at least one wireless device with respect to a wireless charger can be known in advance of the vehicle coming into communication range.

After the vehicle 410 comes within communication range of the transceivers 415 and 422, the transceiver 412 of the vehicle may engage in wireless communication with the transceivers 415 and 422 for determining the relative position of the vehicle 410 with respect to the charging pad 420, based on measurements of the distances between the transceiver 412 and the transceivers 415 and 422. These additional distance measurements can be processed at the vehicle (e.g., by an ECU or by the transceiver 412). Alternatively, the additional distance measurements can be processed at the charging pad 420 (e.g., by the transceiver 422). To measure the distance between the transceiver 412 and each of the transceivers 415, the transceivers 415 may transmit beacon signals that are received by the transceiver 412. Similarly, the transceiver 422 of the charging pad 420 may transmit a beacon signal received by the transceiver 412. Alternatively, the transceiver 412 may broadcast a beacon signal that is received by the transceivers 415 and 422. The measured distances can then be used to determine the relative position of the vehicle 410 using trilateration.

FIG. 4 is an example of a system in which a wireless device of a vehicle communicates with a plurality of wireless devices external to the vehicle, where the relative positions of the plurality of wireless devices is known or determined in advance. In the example of FIG. 4, four transceivers 415 are placed in positions near (i.e., within communication range of) a transceiver 422 associated with the charging pad 420. However, the number of wireless devices near the charging pad could be more or fewer. For example, trilateration could be performed using three transceivers 415 or using two transceivers 415 in combination with the transceiver 422. Therefore, other configurations of wireless devices are possible.

Figure 5:
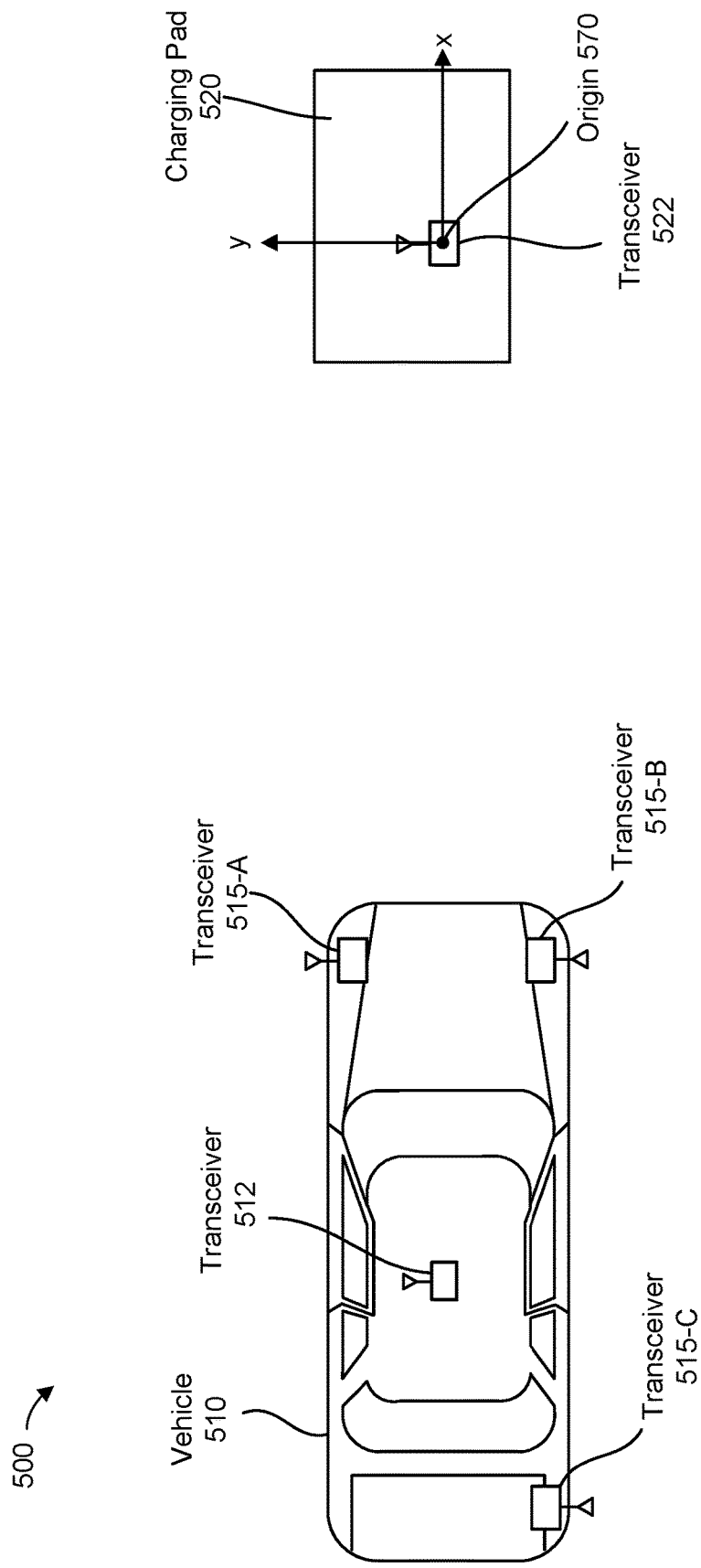

FIG. 5 illustrates an example system 500 according to an embodiment. The system 500 includes a vehicle 510 and a charging pad 520. The charging pad 520 includes a transceiver 522. The vehicle 510 includes a transceiver 512. In contrast to the embodiment of FIG. 4 where a plurality of additional transceivers 415 are placed near the charging pad 420, the embodiment of FIG. 5 features transceivers 515 that are mounted in various locations throughout the vehicle 510. For example, as shown in FIG. 5, each transceiver 515 can be placed at a different corner of the vehicle 510. In one embodiment, the transceivers 515 are UWB anchors and the transceivers 512 and 522 are UWB tags. For example, the transceivers 512 and 515 may be part of a keyless entry system in which relay attacks are prevented by verifying, using UWB signals, that a wireless vehicle key is within proximity of the vehicle before unlocking the vehicle.

Because the transceivers 512 and 515 are mobile, their positions relative to the charging pad (e.g., positions in a 2D coordinate system in which the origin 570 is at the transceiver 522) cannot be determined in advance, i.e., prior to the vehicle coming into communication range of the transceiver 522. However, the positions of the transceivers 512 and 515 relative to a charge receiving device may be known (e.g., stored in a memory of the transceiver 512) since the transceivers 512 and 515 are usually mounted according to the specifications of a vehicle manufacturer, and therefore in stationary positions relative to the vehicle. One advantage of having transceivers on the vehicle is that they can be powered by a battery of the vehicle, and can therefore broadcast beacon signals without concern that the power supply of the transceivers 515 will be depleted.

The position of the vehicle relative to the charging pad 520 can be determined based on measurements of the distances between the transceiver 522 of the charging pad and the transceivers 515 and 512 of the vehicle. The measurements can be performed after the vehicle 510 comes within communication range of the transceiver 522. As with the example of FIG. 4, the relative position of the vehicle can be determined based on trilateration performed at the vehicle (e.g., by the transceiver 512 or an ECU) or at the charging pad (e.g., by transceiver 522).

Figure 6:
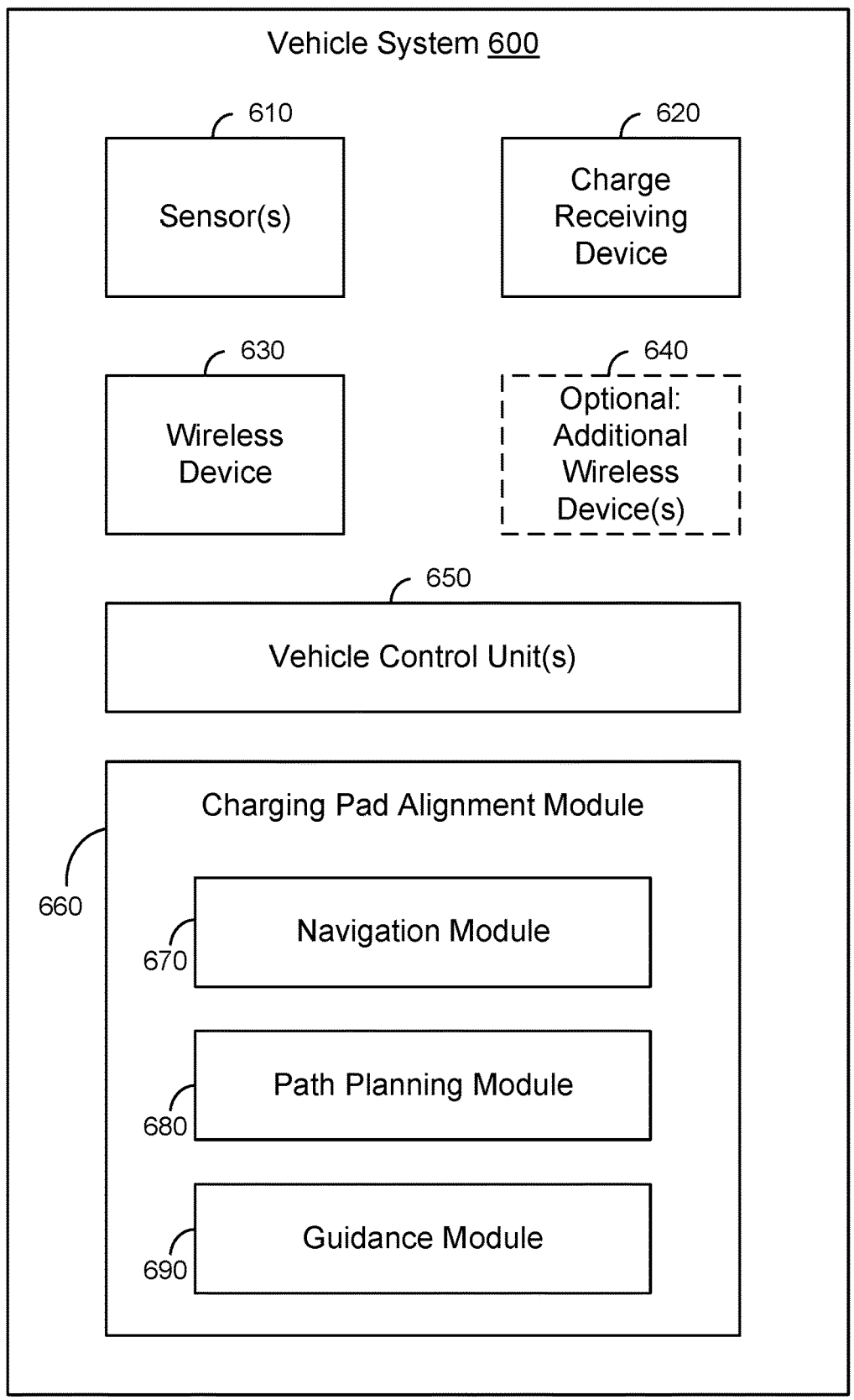
FIG. 6 is a simplified block diagram of a vehicle system according to an embodiment.

FIG. 6 is a simplified block diagram of a vehicle system 600 according to an embodiment. The vehicle system 600 includes one or more sensors 610, a charge receiving device 620, a wireless device 630 and, optionally, one or more additional wireless devices 640. The vehicle system 600 further includes one or more vehicle control units 650 and a charging pad alignment module 660.

The sensors 610 include at least one sensor that captures data used for aligning the vehicle to a wireless charger, e.g., a radar sensor, a LIDAR sensor, a camera, an ultrasonic sensor, or a combination of any of the preceding sensors. The sensors 610 may further include multiple instances of the same type of sensor. For example, in some embodiments, the vehicle system 600 may include multiple cameras or radar sensors positioned around the perimeter of the vehicle. Sensors 610 can be placed anywhere on the vehicle, including mounted to an exterior surface of the vehicle or inside the vehicle. Sensors 610 may also be used in connection with other vehicle operations such as navigation. Accordingly, the sensors 610 may further include a GPS sensor, a steering angle sensor, an accelerometer, a gyroscope, and the like.

The charge receiving device 620 is configured to receive power from a wireless charger, for example, through inductive charging. Inductive charging works by generating an oscillating electromagnetic field using a primary coil. The electromagnetic field induces a current in a secondary coil in proximity to the primary coil. Another example of a wireless power transfer method that can be used with the charge receiving device 620 is resonant coupling, which also involves transferring power by inducing current in the receiving coil. For this reason, resonant coupling is sometimes referred to as resonant inductive coupling. Resonant coupling differs from inductive coupling in that the coils are operated at identical or near-identical resonant frequencies. Resonant coupling generally requires less precise alignment compared to inductive coupling, but is also generally less efficient in transferring power. Accordingly, in certain embodiments, the charge receiving device 620 may include a receiving coil (e.g., the secondary coil 132 in FIG. 1).

The charge receiving device 620 may further include various electrical components that participate in receiving power from the wireless charger and delivering the received power to a battery of the vehicle. For example, the charge receiving device 620 may include a circuit that regulates the current generated in the receiving coil (e.g., to limit the current to a safe level), a rectifier that converts the generated current from an alternating current to a direct current (DC), and/or a DC-to-DC converter that changes a voltage level of the generated current for compatibility with the battery or some other load to which the charge receiving device 620 is coupled.

The wireless device 630 can be a transmitter, a receiver, or a transceiver. The wireless device 630 may send and/or receive wireless signals which, as mentioned earlier, can be UWB signals. The wireless device 630 can be mounted in any number of locations of the vehicle (e.g., in one of the four corners of the vehicle). In some embodiments, the wireless device 630 may be located at or near the roof of the vehicle, so as to include or be electrically coupled to a roof mounted antenna for sending and/or receiving wireless signals. In general, the wireless device 630 is fixed in place once installed in the vehicle. However, in some embodiments, the wireless device 630 may be repositioned after initial installation. The wireless device 630 can be powered by a battery of the vehicle, for example, the same battery that is charged by the charge receiving device 620 or some other power source such as an integral or removable battery that is local to the wireless device 630.

When implemented as a transmitter, the wireless device 630 may be configured to broadcast signals into the surrounding environment, e.g., a beacon signal comprising pulses that are emitted at predefined intervals, according to a particular communication protocol. The broadcast signals can be received by another wireless device (e.g., a receiver in a parking infrastructure) and processed to, among other things, measure a distance between the wireless device 630 and the receiver. One way to measure distance using UWB signals is to send multiple time-varying signals (e.g., sinusoidal signals) with different frequencies, with the time-varying signals being combined at a receiver to form a pulse having a well-defined peak. The location of the peak can be used to estimate time-of-flight. Transmitting the time-varying signals over a wide bandwidth such as the bandwidths associated with UWB enables the pulse to be sharp, thereby providing an accurate time-of-flight estimate.

In some embodiments, the broadcast signals may include information used for aligning the vehicle to the wireless charger. Examples of such information include stored information about a known position of the wireless device 630 (e.g., coordinates in a 2D coordinate system referenced to the vehicle) or an identifier by which the signals from the wireless device 630 can be distinguished from signals sent from neighboring wireless devices (e.g., a unique hardware identifier assigned to the wireless device 630).

When implemented as a receiver, the wireless device 630 may be configured to receive signals from another wireless device (e.g., a transmitter in the parking infrastructure). The received signals may be processed, either locally within the wireless device 630 or by a processor of the vehicle (e.g., by vehicle control unit 650) to, among other things, measure a distance between the wireless device 630 and a sender based on time-of-flight or signal strength. The received signals can be broadcast signals. In some embodiments, the received signals may include targeted signals that are sent with the wireless device 630 as an intended recipient. For example, wireless device 630 may receive messages from another wireless device over a communication channel (e.g., a specific frequency or frequency range within a UWB bandwidth) that is assigned to the wireless device 630.

In some embodiments, the wireless device 630 receives signals from multiple wireless devices, and the received signals are combined to determine the position of the vehicle through trilateration. The processing of the received signals may involve determining the relative position of the vehicle using, for example, a Kalman filter or a least squares estimation algorithm. In other embodiments, the wireless device 630 receives a signal from which a distance measurement is obtained, and the measured distance is combined with sensor data from one or more of the sensors 610 to determine the relative position of the vehicle.

When implemented as a transceiver, the wireless device 630 may be configured to perform any of the example operations described above with respect to the transmitter-only and receiver-only implementations. Further, the transceiver may engage in one or more messaging transactions with another transceiver (e.g., with the transceiver 422 in FIG. 4) in order to communicate, from one transceiver to another, information that is used for aligning the vehicle to the wireless charger. One example of such information is distances or relative positions of other wireless devices, where the distances are determined by the sender-transceiver based on separate communications between the sender-transceiver and the other wireless devices. In the example of FIG. 4, this could include sending, from the transceiver 422 to the transceiver 412, the relative positions of the transceivers 415.

With the exception of certain vehicle-specific aspects such as receiving power from a vehicle battery, the above discussion of the wireless device 630 is also generally applicable to any of the wireless devices described herein as being external to the vehicle, including wireless devices placed on or near a wireless charger.

The additional wireless device(s) 640 may be implemented in a similar manner to the wireless device 630. Thus, the above discussion of the wireless device 630 also applies to the wireless devices 640. The wireless devices 630 and 640 may be of the same or different types. For example, the wireless device 630 could be a transceiver and the additional wireless devices 640 could be transmitters that send signals to the wireless device 630 and/or to a wireless device external to the vehicle. In some embodiments, the wireless devices 640 are UWB anchors and the wireless device 630 is a UWB tag.

Vehicle control unit(s) 650 may include one or more hardware and/or software based controllers that control various aspects of vehicle operation. For example, the vehicle control unit 650 may include one or more ECUs that control the engine, a transmission, power steering, a powertrain, acceleration, and/or braking. The vehicle control unit 650 may be communicatively coupled to the other elements shown in FIG. 6. For example, the vehicle control unit 650 may include a telematics controller that processes data from a GPS sensor included in the sensors 610 to determine a position of the vehicle in connection with navigation.

Further, the vehicle control unit 650 may include one or more controllers that control the wireless devices 630 and 640 (e.g., enabling or disabling the wireless devices or providing data for transmission by the wireless devices). In some embodiments, the vehicle control unit 650 includes one or more controllers that process data received by the wireless device 630 and/or the wireless device 640 to determine a position of the vehicle relative to the wireless charger. However, as mentioned earlier, such processing can also be performed locally within a wireless device. Once the relative position of the vehicle is determined, the vehicle control unit(s) 650 may calculate a trajectory for maneuvering the vehicle into a charging position. In some embodiments, the vehicle control unit 650 may perform automated parking to park the vehicle into the charging position based on the calculated trajectory. Alternatively, the trajectory could be output on a display of the vehicle system 600 to assist the driver in manual parking. In some embodiments, a visual representation of the vehicle or a visual representation of the charge receiving device of the vehicle could be displayed along with a visual representation of the wireless charger to show the relative position of the vehicle/charge receiving device together with, or as an alternative to, displaying the trajectory.

In some embodiments, the vehicle control unit 650 may include one or more processors that execute instructions stored in one or more non-transitory computer-readable storage media. For example, charging pad alignment module 660 can be implemented as one or more software programs that are executed by one or more processors of the vehicle control unit 650. Thus, vehicle system 600 may comprise a computer system that, among other things, processes received wireless signals to determine the relative position of the vehicle and to facilitate the alignment of the vehicle to a wireless charger by, for example, computing a trajectory that enables the vehicle to park into the charging position.

The charging pad alignment module 660 can also be implemented in hardware or a combination of hardware and software. The charging pad alignment module 660 includes a navigation module 670, a path planning module 680, and a guidance module 690. The navigation module 670 may include circuitry or instructions for generating a map of the environment surrounding the vehicle and for determining the position of the vehicle and/or the various wireless devices on the map. The navigation module 670 may implement any of the techniques described herein for determining the relative position of the vehicle in relation to the position of the wireless charger.

The path planning module 680 may include circuitry or instructions for calculating a trajectory to the wireless charger. In some embodiments, multiple trajectories may be calculated, including a global trajectory that specifies an overall path from the current position of the vehicle to the wireless charger and a local trajectory that specifies a portion of the overall path in greater detail. The global trajectory may correspond to one or more maneuvers that, when executed, bring the vehicle into the charging position. For example, depending on the amount of space available for maneuvering, the presence of objects in the surrounding environment, the initial orientation of the vehicle relative to the wireless charger, the location of the charge receiving device 620 on the vehicle, and/or other considerations, the path planning module 680 may select a specific type of parking to be performed, such as parallel, angle, or reverse parking. For instance, reverse parking may be selected if the charge receiving device 620 is mounted towards the rear of the vehicle and there is not enough room, given the geometry and minimum turning radius of the vehicle, to align the vehicle to the wireless charger using forward movement. The path planning module 680 may compute a global trajectory that minimizes the number of maneuvers that are needed to bring the vehicle into the charging position.

The guidance module 690 may include circuitry or instructions for adjusting longitudinal and/or lateral control parameters to keep the vehicle on the global trajectory within a tolerance range. For example, guidance module 690 may adjust the amount of acceleration or braking applied to keep the vehicle to within half a meter of the global trajectory as the vehicle is being maneuvered. If the vehicle is being manually operated, the guidance module 690 may generate audio and/or visual output (e.g., using a display or a speaker in the vehicle) to alert the driver of deviations beyond the tolerance range. The driver may also be provided with audio and/or visual updates on the progress of the vehicle (e.g., the display may indicate the remaining distance until the wireless charger is reached). In some embodiments, the maneuvering of the vehicle may be semi-automated, for example, with the driver performing longitudinal control by providing acceleration and/or braking input while the vehicle system 600 provides lateral control by adjusting the steering angle.

The guidance module 690 may also perform fine adjustments to complete the alignment of the vehicle once the vehicle is within a certain distance of the wireless charger. For example, once the vehicle is close enough that the charge receiving device 620 can detect inductive coupling to the wireless charger, the guidance module 690 may determine small movements for precisely locating the charging position based on measurements of the strength of the inductive coupling between the charge receiving device 620 and the wireless charger. Maneuvering may be terminated, and the vehicle parked in place, once the induction strength has reached a certain threshold (e.g., a mutual inductance of 40 microhenries or greater).

During maneuvering, the vehicle control unit 650 may monitor data from the sensors 610 (e.g., an ultrasonic sensor or a camera) to detect obstacles. If an imminent collision with an obstacle is detected, the vehicle control unit 650 may trigger automated emergency braking. Alternatively, if the collision is not imminent, the vehicle control unit 650 may calculate a new trajectory using path planning module 680, where the new trajectory avoids the obstacle while bringing the vehicle to the wireless charger. Collision detection can be performed by periodically checking whether the current trajectory is free of obstacles. Collision detection may be performed in conjunction with checking for deviations from the current trajectory, e.g., every 40 milliseconds. A new trajectory can also be calculated if the vehicle is too far off-course from the current trajectory.

Once the vehicle has reached the charging position, any wireless devices associated with the wireless charger may be temporarily disabled (e.g., in response to a request from wireless device 630) in order to prevent another vehicle from communicating with the wireless device associated with the wireless charger and attempting to park in the same parking space. Other wireless devices in the parking infrastructure may remain active since the other wireless devices may be used for aligning the other vehicle to a different wireless charger.

Figure 7:
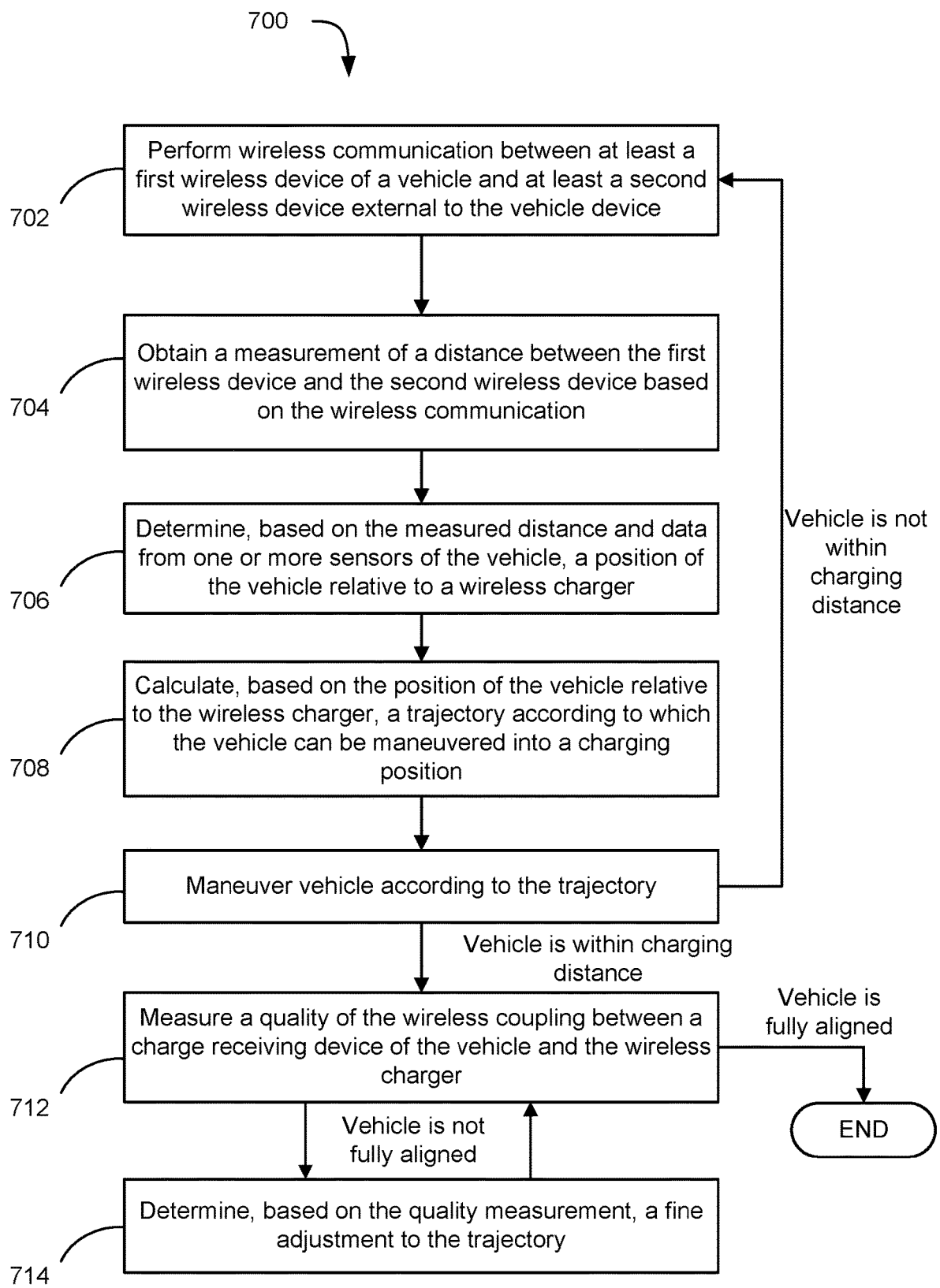
FIGS. 7 and 8 are flow charts of methods for aligning a vehicle to a wireless charger, according to certain embodiments.

FIG. 7 is a flow chart of a method 700 for aligning a vehicle to a wireless charger, according to one or more embodiments of the present disclosure. The method 700 can be performed by one or more processors of a vehicle system (e.g., the vehicle control unit 650 in FIG. 6) in conjunction with actions performed by at least a first wireless device of the vehicle and at least a second wireless device external to the vehicle. Certain steps described in connection with the vehicle system can also be performed by one or more processors external to the vehicle (e.g., a processor associated with the wireless charger). The method 700 can be performed using various configurations of wireless devices, such as the configuration shown in FIG. 3, where the receiver 312 communicates with the transmitter 322.

At step 702, wireless communication is performed between the first wireless device (of the vehicle) and the second wireless device (external to the vehicle). The position of the second wireless device relative to a wireless charger may be known and, in some embodiments, communicated to the first wireless device as part of the wireless communication in step 702. The wireless communication may be triggered by the vehicle coming within communication range of the second wireless device. For example, in FIG. 3, the wireless communication may be triggered once the receiver 312 recognizes a signal from the transmitter 322. The wireless communication in step 702 may include the transmission of one or more beacon signals between the first wireless device and the second wireless device. For example, the transmitter 322 may broadcast a set of UWB signals that enable a distance between the transmitter 322 and the receiver 312 to be determined.

At step 704, a measurement of a distance between the first wireless device and the second wireless devices is obtained based on the wireless communication. As mentioned earlier, one way to measure distance using UWB signals is to detect a peak in a signal generated by combining a plurality of time-varying signals transmitted over different frequencies. The distance can be calculated by a processor of the vehicle system or a processor external to the vehicle, e.g., a processor associated with a wireless charger. For example, the processor that performs the distance calculation can be a processor within the first wireless device or the second wireless device.

If the first and second wireless devices are a transmitter and a receiver, the distance can be calculated based on a time of arrival of one or more signals sent from the transmitter to the receiver. If the first and second wireless devices are transceivers, the distance can alternatively be calculated based on a round-trip time (e.g., the length of time between one transceiver sending a signal and receiving an acknowledgement from the other transceiver). To facilitate the distance measurement, the first wireless device may be time-synchronized with the second wireless device. In some embodiments, synchronization is based on a global time reference, for example a time server that is coupled to the first wireless device and the second wireless device over a communication network. In other embodiments, the first wireless device and the second wireless device may establish a shared time reference as part of the wireless communication in step 702.

At step 706, a position of the vehicle relative to the wireless charger is determined based on the measured distance and data from one or more sensors of the vehicle. In particular, the measured distance can be fused with sensor data from a camera, a LIDAR sensor, a radar sensor, and/or an ultrasonic sensor to determine the relative position of the vehicle. For example, an angle between the vehicle and the wireless charger may be determined from a camera image. The angle may be combined with the measured distance to more precisely determine the vehicle's position. Depending on what sensor data is available, the position of the vehicle relative to the wireless charger may or may not be able to be determined exactly. Nevertheless, the measured distance and the sensor data can provide at least an approximate indication of how close the vehicle is to the wireless charger and the extent of any steering adjustments that are needed to align the vehicle with the wireless charger. Further, the position determination can take into consideration information about the known position of one or more wireless devices in the vehicle (e.g., the position of the receiver 312) and/or external to the vehicle (e.g., the position of the transmitter 322). Such position information may be available to a processor of the vehicle and/or a processor associated with the wireless charger, prior to the wireless communication in step 702. For example, as discussed earlier in connection with FIG. 5, information about the known positions of transceivers in the vehicle can be stored in a memory of one of the in-vehicle transceivers. As with the distance measurement in step 704, the relative position of the vehicle can be calculated by the vehicle system or a processor external to the vehicle. If the position of the vehicle is calculated by a processor external to the vehicle (e.g., a processor of the second wireless device or some other processor associated with the wireless charger), then the position may be communicated to a processor in the vehicle (e.g., to the first wireless device or an ECU, using UWB transmission) for performing the trajectory calculation in step 708.

At step 708, a trajectory is calculated, by a processor in the vehicle, based on the position of the vehicle relative to the wireless charger. The trajectory is a trajectory according to which the vehicle can be maneuvered into a charging position in which a charge receiving device of the vehicle is aligned with respect to the wireless charger. In some embodiments, the trajectory may be calculated by a vehicle control unit.

At step 710, the vehicle is maneuvered according to the calculated trajectory. The maneuvering can be performed manually, fully automated, or semi-automated. For example, the trajectory can be output to the driver using an in-vehicle display in order to show the driver how to maneuver the vehicle, as well as to update the driver on the progress of the alignment. If the maneuvering is semi-automated, the vehicle system may provide a portion of the driving inputs while the driver provides the rest. For example, the vehicle system could control steering while the driver is responsible for operating the acceleration pedal and the brake pedal of the vehicle. In some embodiments, the vehicle system may perform maneuvering using an automated parking feature, with the driver intervening only in case of an emergency.

During the maneuvering, the vehicle system can monitor the progress of the alignment by detecting whether the vehicle is within charging distance of the wireless charger. One way to perform this detection is by checking whether the charge receiving device of the vehicle is currently coupled to the wireless charger. If so, then the vehicle is determined to be within charging distance and the method proceeds to step 712. If the vehicle is not within charging distance, then the method returns to step 702 and a new trajectory may be calculated, if needed, in step 708 based on an updated distance measurement and updated sensor data.

At step 712, a quality of the wireless coupling between the charge receiving device and the wireless charger is measured. For example, if the wireless charger is an inductive charger, mutual inductance can be used as a quality metric. Other quality metrics are also possible. If the quality measurement indicates that the vehicle is fully aligned (e.g., based on a threshold mutual inductance), the method 700 terminates. Otherwise, the method proceeds to step 714.

At step 714, a fine adjustment to the trajectory is determined based on the quality measurement in step 712. The fine adjustment comprises a longitudinal and/or lateral movement, typically on the order of a few centimeters. As with the maneuvering in step 710, the fine adjustment could be performed manually, semi-autonomously, or fully automated. After the fine adjustment is performed, the method returns to step 712, where the quality of the wireless coupling is measured again to determine whether an additional fine adjustment is needed.

Figure 8:
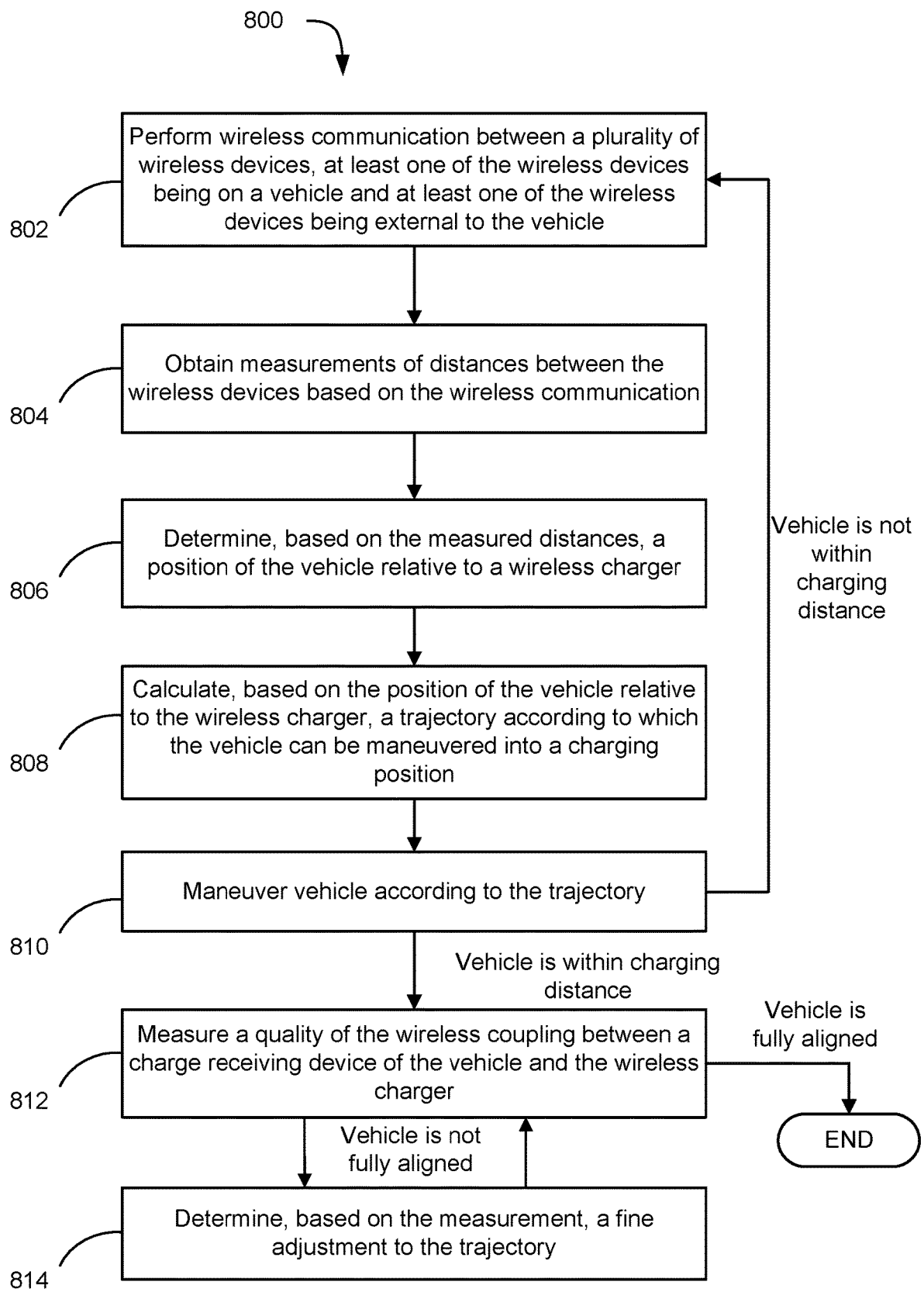

FIG. 8 is a flow chart of a method 800 for aligning a vehicle to a wireless charger, according to one or more embodiments of the present disclosure. The method 800 can be performed by one or more processors of a vehicle system (e.g., the vehicle control unit 650 in FIG. 6) in conjunction with actions performed by a plurality of wireless devices, including at least one wireless device on the vehicle and at least one wireless device external to the vehicle. Certain steps described in connection with the vehicle system can also be performed by one or more processors external to the vehicle (e.g., a processor associated with the wireless charger). The method 800 can be performed using various configurations of wireless devices, such as the configuration shown in FIG. 4, where the transceiver 412 communicates with the transceivers 415 and 422. The method 800 can also be performed using the configuration shown in FIG. 5, where the transceiver 522 communicates with the transceivers 512 and 515.

At step 802, wireless communication is performed between the plurality of wireless devices. The wireless communication in step 802 can be triggered in a similar manner to the wireless communication in step 702 of FIG. 7, once the vehicle comes within communication range of a wireless device external to the vehicle. If there are more than two wireless devices, communication may occur between wireless device pairs at different times. For example, in FIG. 4, the transceiver 412 of the vehicle 410 may communicate with transceiver 415-A before communicating with transceiver 415-B because transceiver 415-A is closer to the vehicle. The communication in step 802 may, in some embodiments, include the transmission of information about the known position of a wireless device external to the vehicle to a wireless device of the vehicle. In other embodiments, the communication in step 802 may include the transmission of information about the known position of a wireless device of the vehicle to a wireless device external to the vehicle.

The communication in step 802 may also include beacon signals transmitted from one wireless device to a plurality of other wireless devices or beacon signals transmitted from a plurality of wireless devices to a single wireless device. For example, the transceivers 415 and 422 could send beacon signals to the transceiver 412 or the transceiver 412 could send beacon signals to the transceivers 415 and 422. Similarly, in FIG. 5 the transceiver 522 could send beacon signals to the transceivers 512 and 515 or the transceivers 512 and 515 could send beacon signals to the transceiver 522.

At step 804, measurements of distances between the wireless devices are obtained based on the wireless communication in step 802. In the embodiment of FIG. 4, the distances between the transceiver 412 of the vehicle and at least some of the transceivers 415 and 422 may be measured depending on which of the transceivers 415 and 422 are within range of transceiver 412. Similarly, in the embodiment of FIG. 5, distances between the transceiver 522 on the charging pad 520 and at least some of the transceivers on the vehicle (i.e., transceivers 512 and 515) may be measured depending on which of the transceivers 512 and 515 are within range of the transceiver 522. The distances can be measured in a similar manner to the distance measurement in step 704 of FIG. 7.

At step 806, the position of the vehicle relative to a wireless charger is determined based on the distances measured in step 804. The position determination can take into consideration information about the known position of one or more wireless devices in the vehicle and/or external to the vehicle. In the embodiment of FIG. 4, the position of the vehicle can be determined based on measured distances between the transceiver 412 and at least three transceivers among a set of transceivers comprising transceivers 415-A, 415-B, 415-C, 415-D, and 422. Similarly, in the embodiment of FIG. 5, the position of the vehicle can be determined based on measured distances between the transceiver 522 and at least three transceivers among a set of transceivers comprising transceivers 515-A, 515-B, 515-C, and 512. The relative position of the vehicle can be calculated by a processor of the vehicle or a processor external to the vehicle, e.g., a processor in an wireless device associated with the wireless charger.

Steps 808-814 of FIG. 8 are analogous to steps 708-714 of FIG. 7. At step 808, a trajectory is calculated for maneuvering the vehicle into a charging position. The trajectory can be calculated by the vehicle system or a processor external to the vehicle, based on the relative position of the vehicle as determined during step 806. The trajectory calculation in step 808 may or may not be performed in a similar manner as in step 708 because the fusion of a measured distance with sensor data in step 706 may produce a representation of the vehicle position that differs from a representation produced through combining multiple distance measurements, as in step 806. In one embodiment, the relative position determined in step 806 is a position within a 2D coordinate system referenced to the vehicle or the wireless charger. The origin of the 2D coordinate system could be the location of a wireless device or a predefined location within the vehicle or wireless charger. Accordingly, the trajectory can be calculated as a straight or curved path connecting the origin to a second point, where the second point corresponds to the position of the vehicle or the wireless charger.

FIG. 9 illustrates an example trajectory 900 for aligning a vehicle to a wireless charger, according to one or more embodiments of the present disclosure. The trajectory 900 may correspond to a trajectory calculated according to the method of FIG. 8. The trajectory 900 connects a vehicle 910 to a charging pad 920. The trajectory 900 includes a first endpoint at the vehicle 910 and a second endpoint at the charging pad 920. The relative position of the vehicle 910 can be expressed as a difference between the first endpoint and the second endpoint. For example, if the first endpoint corresponds to a location (x, y) of the center of the charge receiving device and the second endpoint corresponds to a location $(x_t, y_t)$ of the center of the charging pad, the relative position can be expressed as a difference between the locations (x, y) and $(x_t, y_t)$.

In FIG. 9, the charging pad 920 and another charging pad 930 are both available. The charging pads 920 and 930 are located within parking spaces 922 and 932, respectively. A third parking space 942 is occupied by a parked vehicle 940. The charging pad 920 could be selected manually or automatically determined. For example, the vehicle system or a processor associated with the charging pad 920 could determine that the vehicle 910 is closer to the charging pad 920 than the charging pad 930 and, based on this determination, select the charging pad 920 for coupling to the charge receiving device of the vehicle 910. In some embodiments, the determination of which charging pad to use could be based on communication between available charging pads.

The trajectory 900 can be calculated taking into consideration the geometry and handling characteristics of the vehicle 910 (e.g., the length, width, and minimum turning radius). The trajectory calculation can also take into consideration the amount of space available for parking. For example, if the vehicle 940 is parked close to the parking space 922, the trajectory could be calculated to bring the vehicle 910 to an optimal charging position that balances charging efficiency versus maximum lateral separation from the vehicle 940.

Returning to FIG. 8, at step 810, the vehicle is maneuvered according to the calculated trajectory. The maneuvering can be performed in a manner similar to that described in connection with step 710 of FIG. 7.

At step 812, a quality of the wireless coupling is measured once the vehicle is within charging distance, in order to determine whether the vehicle is fully aligned. The quality measurement can be performed in a manner similar to that described in connection with step 712 of FIG. 7.

At step 814, a fine adjustment to the trajectory is determined based on the quality measurement in step 812. The fine adjustment can be determined in a manner similar to that described in connection with step 714 of FIG. 7. The method 800 then returns to step 812 and terminates once a determination is made, based on the quality measurement, that the vehicle is fully aligned.

In some embodiments, a wireless device associated with the wireless charger is configured to temporarily disable itself when the wireless device detects the presence of a vehicle parked at the wireless charger or when the wireless charger is in the process of charging a vehicle. The disabling of the wireless device would prevent another vehicle from detecting the wireless device while the wireless charger is in use or obstructed, and would therefore prevent the other vehicle from attempting to park at the location of the wireless charger. For example, in FIG. 9, a wireless device (not depicted) located on the charging pad 920 could be disabled based on communication between a wireless device of vehicle 910 and the wireless device on the charging pad 920, thereby preventing another vehicle from communicating with the wireless device on the charging pad 920 while the vehicle 910 is being charged.

Figure 10:
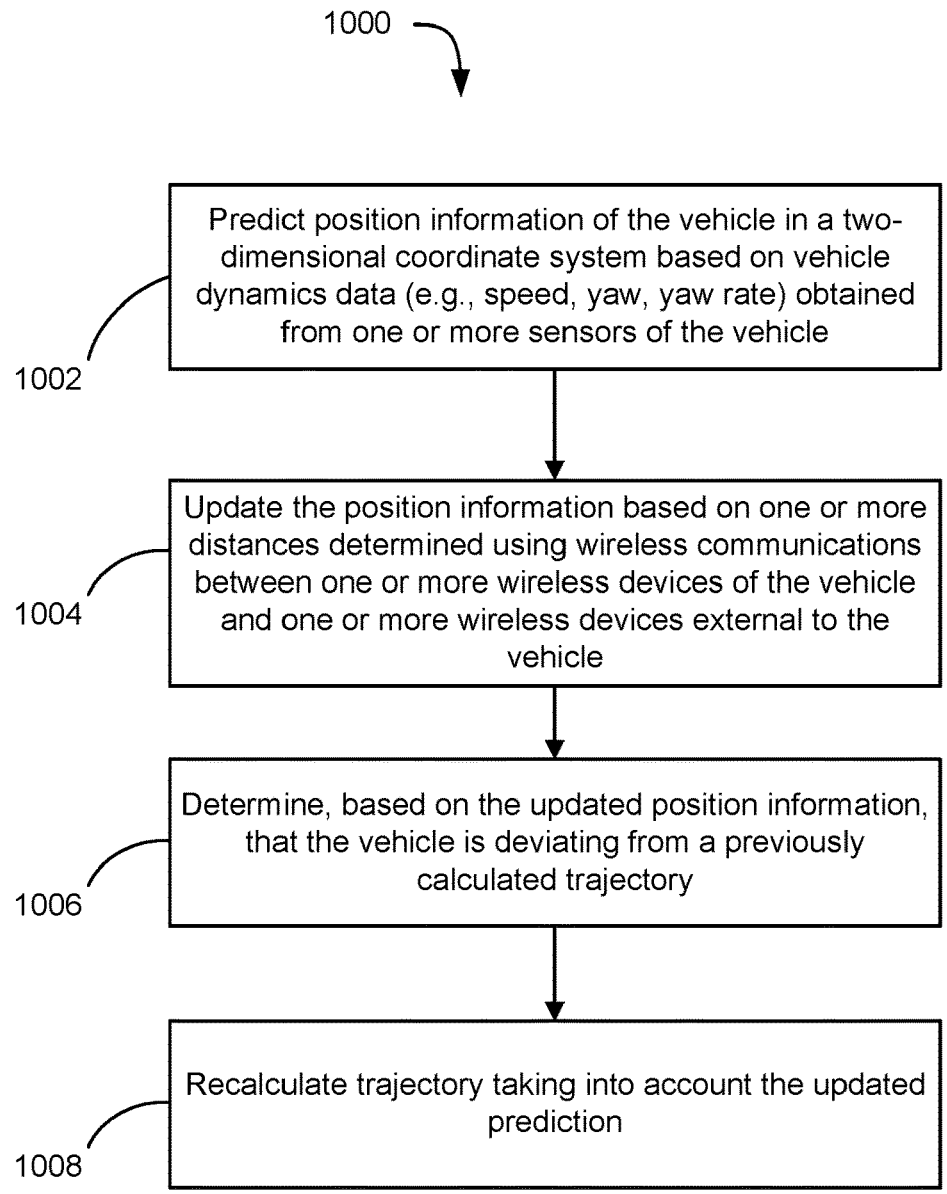
FIG. 10 is a flow chart of a method for calculating a trajectory, according to one or more embodiments.

FIG. 10 is a flow chart of a method 1000 for calculating a trajectory, according to one or more embodiments of the present disclosure. The processing depicted in FIG. 10 corresponds to steps that can be performed using a Kalman filter that continuously estimates the relative position of a vehicle. Other trajectory calculation techniques are also possible.

Figure 11:
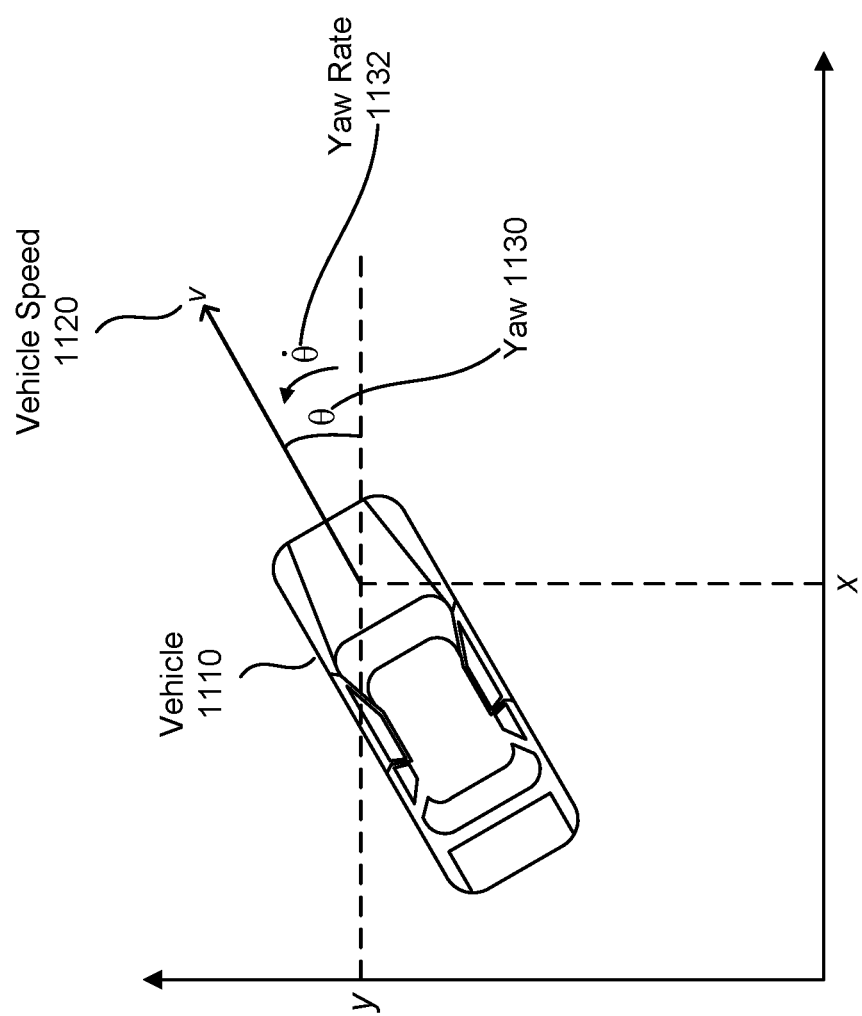
FIG. 11 illustrates position information for representing a vehicle in a two-dimensional coordinate system, according to one or more embodiments.

At step 1002, position information of the vehicle is predicted in a 2D coordinate system based on vehicle dynamics data (e.g., speed, yaw, and yaw rate) obtained from one or more sensors of the vehicle. The position information is illustrated in FIG. 11, where the state of a vehicle 1110 can be represented by a position information vector:

$$\vec{X}=(x,\dot{x},y,\dot{y},\theta)$$

x and y are relative position values of the vehicle along the x and y axes of the 2D coordinate system, $\dot{x}$ and $\dot{y}$ are speed values of the vehicle along the x and y axes, and θ is a heading value correspond to the yaw of the vehicle. The x and y positions can be determined using wireless communication in accordance with the embodiments described above. The vehicle dynamics data may be obtained by a vehicle control unit coupled to the sensors (e.g., an ECU coupled to a steering angle sensor and a gyroscope over a Controller Area Network (CAN) bus of the vehicle system).

In some cases, the vehicle dynamics data may be limited to speed or unavailable. If speed data is available, the Kalman filter may apply a kinematic model to predict the vehicle position. The kinematic model can be a constant speed model that applies when speed values are constant between two consecutive samples (e.g., samples that are 100 milliseconds apart). The following is a set of prediction equations that can be used with a constant speed kinematic model:

$$\hat{x}_{k+1/k} = \hat{x}_{k/k} + v_k \cos \hat{\theta}_{k/k} \times \Delta t$$
$$\hat{y}_{k+1/k} = \hat{y}_{k/k} + v_k \sin \hat{\theta}_{k/k} \times \Delta t$$
$$\hat{\dot{x}}_{k+1/k} = v_k \cos \hat{\theta}_{k/k}$$
$$\hat{\dot{y}}_{k+1/k} = v_k \sin \hat{\theta}_{k/k}$$
$$\hat{\theta}_{k+1/k} = \hat{\theta}_{k/k} + \dot{\theta}_k \times \Delta t$$

In the equations above, k is a time index of a sample and Δt is the time interval between state estimations. k/k denotes a value estimated at time k, using information and measurements up to k. Similarly, k+1/k denotes a value predicted at time k+1, using information and measurements up to k; and k+1/k+1 denotes a value updated at time k+1, using information and measurements up to k+1. $\dot{\theta}$ is a heading rate corresponding to a measured yaw rate. The carat symbol ^ placed above a variable indicates that the value of the variable is estimated by the Kalman filter. d is the relative distance between a wireless device of the vehicle and a wireless device external to the vehicle.

The equations above can be applied to predict what the position, speed, and heading of the vehicle will be at the next sample k+1, using information obtained for the current sample k.

At step 1004, the position information (e.g., the position, speed and heading) is updated based on one or more distances determined using wireless communications (e.g., UWB distance measurements) between one or more wireless devices of the vehicle and one or more wireless devices external to the vehicle. The updating may involve calculating the distance to an external wireless device "i" at sample k+1 using the following equation:

$$d_i(k+1)=\sqrt{(\hat{x}_{k+1/k}-x_i)^2+(\hat{y}_{k+1/k}-y_i)^2}+\varepsilon_i$$

where $d_i$ is the distance between the wireless device of the vehicle and the external wireless device, $x_i$ and $y_i$ are relative position values of the wireless device i, and $\varepsilon_i$ represents noise in the distance $d_i$.

At step 1006, a determination is made, based on the updated position information, that the vehicle is deviating from a previously calculated trajectory. The determination can be based on the position, speed, and/or heading of the vehicle, as updated based on step 1004.

At step 1008, the trajectory is recalculated taking into account the updated position information. In cases of minor deviations where the vehicle is only slightly off-course, a new trajectory does not have to be calculated. Instead, it may be more appropriate to maintain the current trajectory by, for example, adjusting the steering angle to bring the vehicle back onto the current trajectory. A new trajectory may be calculated when the deviations exceed a certain acceptable limit (e.g., a threshold distance away from the current trajectory combined with speed above a certain value and a heading that is angled away from the current trajectory).

Figure 12:
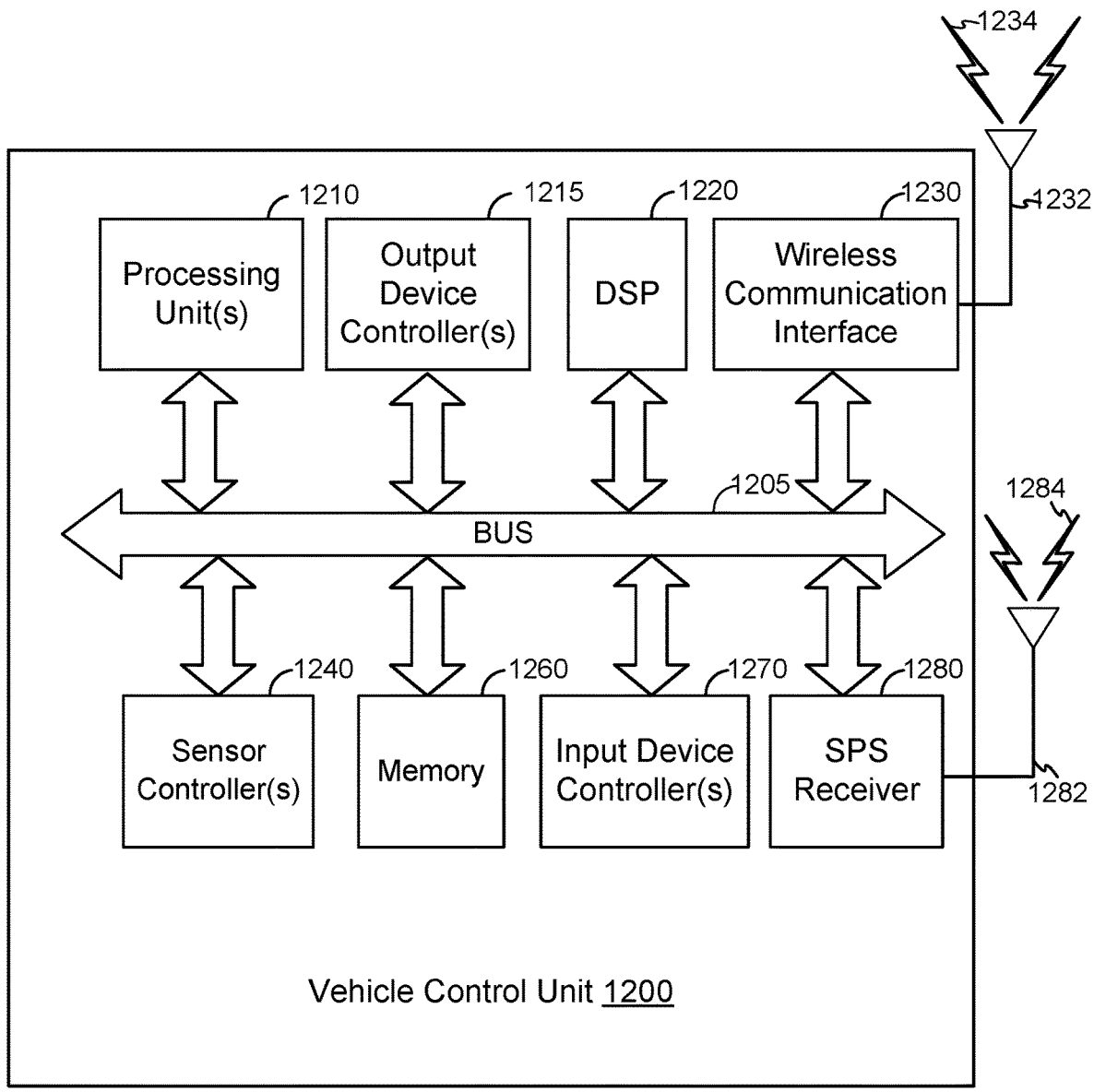
FIG. 12 is a simplified block diagram of a vehicle control unit usable for implementing one or more embodiments.

FIG. 12 is a simplified block diagram of a vehicle control unit 1200 usable for implementing one or more embodiments of the present disclosure. For instance, vehicle control unit 1200 may represent an implementation of the vehicle control unit 650 in FIG. 6. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations.

The vehicle control unit 1200 is shown comprising hardware elements that can be electrically coupled via a bus 1205 such as a CAN bus (or may otherwise be in communication, as appropriate). The hardware elements may include a processing unit(s) 1210 which can include without limitation one or more general-purpose processors, one or more special-purpose processors (such as digital signal processing (DSP) chips, graphics acceleration processors, application specific integrated circuits (ASICs), and/or the like), and/or other processing structure or means. Some embodiments may have a separate DSP 1220, depending on desired functionality. The vehicle control unit 1200 also can include one or more input device controllers 1270, which can control without limitation an in-vehicle touch screen, a touch pad, microphone, button(s), dial(s), switch(es), and/or the like; and one or more output device controllers 1215, which can control without limitation a display, light emitting diode (LED), speakers, and/or the like.

The vehicle control unit 1200 may also include a wireless communication interface 1230, which can include without limitation a modem, a network card, an infrared communication device, a wireless communication device, and/or a chipset (such as a Bluetooth device, an IEEE 802.11 device, an IEEE 802.16.4 device, a Wi-Fi device, a WiMax device, cellular communication facilities including 4G, 5G, etc.), and/or the like. The wireless communication interface 1230 may permit data to be exchanged with a network, wireless access points, other computer systems, and/or any other electronic devices described herein. The communication can be carried out via one or more wireless communication antenna(s) 1232 that send and/or receive wireless signals 1234.

In certain embodiments, the wireless communication interface 1230 may operate as one of the wireless devices previously described (e.g., transceiver 412 in FIG. 4). Thus, wireless communication interface 1230 may be configured to send and/or receive UWB signals in connection with vehicle alignment to a wireless charger. Accordingly, in some embodiments the functionality of the previously described wireless devices may be bundled into a control unit that controls one or more aspects of vehicle operation. In other embodiments, the vehicle control unit 1200 may include, or the wireless communication interface 1230 may be replaced with, one or more wireless device controllers that control a wireless device such as the transceiver 412.

Depending on desired functionality, the wireless communication interface 1230 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The vehicle control unit 1200 can further include sensor controller(s) 1240. Such controllers can control, without limitation, one or more accelerometer(s), gyroscope(s), camera(s), RADAR sensor(s), LIDAR sensor(s), ultrasonic sensor(s), magnetometer(s), altimeter(s), microphone(s), proximity sensor(s), light sensor(s), and the like.

Embodiments of the vehicle control unit 1200 may also include a Satellite Positioning System (SPS) receiver 1280 capable of receiving signals 1284 from one or more SPS satellites using an SPS antenna 1282. The SPS receiver 1280 can extract a position of the device, using conventional techniques, from satellites of an SPS system, such as a global navigation satellite system (GNSS) (e.g., GPS), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1280 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. The SPS receiver 1280 can be used to, among other things, derive a time reference with which a wireless device of the vehicle is synchronized to a wireless device external to the vehicle for use in connection with aligning the vehicle to a wireless charger.

The vehicle control unit 1200 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/ or the like. Such storage devices may be configured to implement any appropriate data stores, including without limitation, various file systems, database structures, and/or the like.

The memory 1260 of the vehicle control unit 1200 can also comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A method for aligning a vehicle to a wireless charger, comprising:
    performing wireless communication between a first wireless device of the vehicle and a plurality of wireless devices external to the vehicle, wherein the first wireless device has a stationary position relative to the vehicle, and wherein the plurality of wireless devices includes a second wireless device having a stationary position relative to the wireless charger;
    determining a position of the vehicle relative to the wireless charger, wherein:
        the determining of the position of the vehicle relative to the wireless charger comprises calculating, by a processor of the vehicle, the position of the vehicle relative to the wireless charger based on measured distances between the first wireless device and the plurality of wireless devices external to the vehicle, and further based on known positions of the plurality of wireless devices relative to the wireless charger, and
        the known position of at least one wireless device of the plurality of wireless devices is determined using a distance measurement based on wireless communication between the plurality of wireless devices; and
    calculating, by the processor of the vehicle and based on the determined position of the vehicle relative to the wireless charger, a trajectory according to which the vehicle is configured to be maneuvered into a charging position in which a charge receiver of the vehicle is aligned with respect to the wireless charger.

2. The method of claim 1, wherein the position of the vehicle relative to the wireless charger is trilaterated from the measured distances.

3. The method of claim 1, wherein the determining of the position of the vehicle relative to the wireless charger further comprises:
    combining the measured distances with sensor data from at least one sensor of the vehicle.

4. The method of claim 3, wherein the at least one sensor includes a camera, and wherein the determining of the position of the vehicle relative to the wireless charger further comprises:
    determining, using image data from the camera, an angle of the vehicle relative to the wireless charger.

5. The method of claim 1, wherein the determining of the position of the vehicle relative to the wireless charger comprises:
    determining the position of the vehicle relative to a two-dimensional coordinate of the wireless charger.

6. The method of claim 1, further comprising:
    monitoring the position of the vehicle relative to the wireless charger; and
    recalculating the trajectory in response to determining, based on the monitoring, that the vehicle is deviating from the trajectory.

7. The method of claim 6, wherein the monitoring of the position of the vehicle comprises:
    predicting a future position of the vehicle based on vehicle dynamics data, wherein the vehicle dynamics data includes data indicating a speed of the vehicle and a yaw of the vehicle; and
    updating the prediction based on a measured distance between the first wireless device and the second wireless device.

8. The method of claim 1, further comprising:
performing automated parking, the automated parking maneuvering the vehicle according to the calculated trajectory such that the vehicle parks into the charging position.

9. The method of claim 1, further comprising:
presenting a visual representation of the trajectory on a display device of the vehicle.

10. The method of claim 1, wherein the second wireless device is powered by a power source that also powers the wireless charger.

11. A vehicle system for aligning a vehicle to a wireless charger, comprising:
a first wireless device located on the vehicle; and
a vehicle control unit coupled to the first wireless device, the vehicle control unit configured to:
control the first wireless device such the first wireless device performs wireless communication with a plurality of wireless devices external to the vehicle, wherein the first wireless device has a stationary position relative to the vehicle, and wherein the plurality of wireless devices includes a second wireless device having a stationary position relative to the wireless charger;
determine a position of the vehicle relative to the wireless charger, wherein:
to determine the position of the vehicle relative to the wireless charger, the vehicle control unit is configured to receive the position of the vehicle relative to the wireless charger from a processor associated with the wireless charger,
the processor associated with the wireless charger calculates the position of the vehicle relative to the wireless charger based on measured distances between the first wireless device and the plurality of wireless devices external to the vehicle, and further based on known positions of the plurality of wireless devices relative to the wireless charger,
the measured distances are based on the wireless communication with the plurality of wireless devices, and
the known position of at least one wireless device of the plurality of wireless devices is determined using a distance measurement based on wireless communication between the plurality of wireless devices; and
calculate, based on the determined position of the vehicle relative to the wireless charger, a trajectory according to which the vehicle is configured to be maneuvered into a charging position in which a charge receiver of the vehicle is aligned with respect to the wireless charger.

12. The vehicle system of claim 11, wherein the position of the vehicle relative to the wireless charger is trilaterated from the measured distances.

13. The vehicle system of claim 11, wherein the position of the vehicle relative to the wireless charger is further determined using sensor data from at least one sensor of the vehicle.

14. The vehicle system of claim 13, wherein the at least one sensor includes a camera, and wherein the vehicle control unit is configured to determine, using image data from the camera, an angle of the vehicle relative to the wireless charger.

15. The vehicle system of claim 11, wherein the vehicle control unit determines the position of the vehicle relative to a two-dimensional coordinate of the wireless charger.

16. The vehicle system of claim 11, wherein the vehicle control unit is further configured to:
monitor the position of the vehicle relative to the wireless charger, wherein the monitoring of the position of the vehicle comprises:
predicting a future position of the vehicle based on vehicle dynamics data, wherein the vehicle dynamics data includes data indicating a speed of the vehicle and a yaw of the vehicle; and
updating the prediction based on a measured distance between the first wireless device and the second wireless device; and
recalculate the trajectory in response to determining, based on the monitoring, that the vehicle is deviating from the trajectory.

17. The vehicle system of claim 11, wherein the vehicle control unit is further configured to:
perform automated parking, the automated parking maneuvering the vehicle according to the calculated trajectory such that the vehicle parks into the charging position.

18. A non-transitory computer-readable storage medium containing instructions that, when executed by one or more processors of a computer, cause the one or more processors to:
perform wireless communication between at least a first wireless device of a vehicle and a plurality of wireless devices external to the vehicle, wherein the first wireless device has a stationary position relative to the vehicle, and wherein the plurality of wireless devices includes a second wireless device having a stationary position relative to a wireless charger;
determine a position of the vehicle relative to the wireless charger, wherein to determine the position of the vehicle relative to the wireless charger, the one or more processors are configured to perform one of:
(i) calculating the position of the vehicle relative to the wireless charger based on measured distances between the first wireless device and the plurality of wireless devices external to the vehicle, and further based on known positions of the plurality of wireless devices relative to the wireless charger, wherein the known position of at least one wireless device of the plurality of wireless devices is determined using a distance measurement based on wireless communication between the plurality of wireless devices; or
(ii) receiving the position of the vehicle relative to the wireless charger from a processor associated with the wireless charger, wherein:
the processor associated with the wireless charger calculates the position of the vehicle relative to the wireless charger based on measured distances between the first wireless device and the plurality of wireless devices external to the vehicle, and further based on known positions of the plurality of wireless devices relative to the wireless charger,
the measured distances are based on the wireless communication between the first wireless device and the plurality of wireless devices, and
the known position of at least one wireless device of the plurality of wireless devices is determined using a distance measurement based on wireless communication between the plurality of wireless devices; and
calculate, based on the determined position of the vehicle relative to the wireless charger, a trajectory according to which the vehicle is configured to be maneuvered into a charging position in which a charge receiver of the vehicle is aligned with respect to the wireless charger.

\* \* \* \* \*